(12) United States Patent
Fleischman et al.

(10) Patent No.: US 7,436,316 B2
(45) Date of Patent: *Oct. 14, 2008

(54) METHOD AND SYSTEM TO DETECT TAMPERING USING LIGHT DETECTOR

(75) Inventors: Scott G. Fleischman, Palmetto, FL (US); James L. Tucker, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 226 days.

This patent is subject to a terminal disclaimer.

(21) Appl. No.: 11/325,733

(22) Filed: Jan. 5, 2006

(65) Prior Publication Data

US 2007/0152840 A1 Jul. 5, 2007

(51) Int. Cl.
*G08B 21/00* (2006.01)

(52) U.S. Cl. .................. 340/686.1; 340/555; 340/556; 250/224

(58) Field of Classification Search ......... 340/555–557, 340/686.1, 686.4, 815.42, 569–570; 250/221–224
See application file for complete search history.

(56) References Cited

U.S. PATENT DOCUMENTS

| | | | |
|---|---|---|---|
| 4,161,348 A | 7/1979 | Ulrich | |
| 4,242,670 A * | 12/1980 | Smith | 340/555 |
| 4,262,284 A * | 4/1981 | Stieff et al. | 340/541 |
| 4,447,123 A | 5/1984 | Page et al. | |
| 4,523,186 A | 6/1985 | Fiarman | |
| 5,026,141 A | 6/1991 | Griffiths | |
| 5,117,457 A | 5/1992 | Comerford et al. | |
| 5,281,952 A * | 1/1994 | Dragan | 340/546 |
| 5,468,990 A | 11/1995 | Daum | |
| 5,506,566 A | 4/1996 | Oldfield et al. | |
| 5,568,124 A | 10/1996 | Joyce et al. | |
| 5,675,319 A | 10/1997 | Rivenberg et al. | |
| 5,677,769 A | 10/1997 | Bendett | |
| 5,821,582 A | 10/1998 | Daum | |
| 5,831,529 A * | 11/1998 | Pantus | 340/555 |
| 6,028,517 A * | 2/2000 | Sansone et al. | 340/569 |
| 6,215,397 B1 | 4/2001 | Lindskog | |
| 6,396,400 B1 | 5/2002 | Epstein, III et al. | |
| 6,400,268 B1 | 6/2002 | Lindskog | |
| 6,692,031 B2 | 2/2004 | McGrew | |
| 6,838,619 B1 | 1/2005 | Soyfertis | |
| 6,853,093 B2 | 2/2005 | Cohen et al. | |
| 6,970,360 B2 | 11/2005 | Sinha | |
| 7,005,733 B2 | 2/2006 | Kommerling et al. | |

(Continued)

FOREIGN PATENT DOCUMENTS

DE 10065747 12/2000

(Continued)

Primary Examiner—George A Bugg
Assistant Examiner—Hoi C Lau
(74) Attorney, Agent, or Firm—McDonnell Boehnen Hulbert & Berghoff LLP

(57) ABSTRACT

An optical anti-tamper system including a light emitting layer located within a chassis, a light detecting layer located within the chassis and one or more detectors optically coupled to the light detecting layer. The one or more detectors are in communication with an alarm. The alarm is operable to transmit a tamper-event warning signal if an increased light level is detected by at least one detector.

19 Claims, 23 Drawing Sheets

U.S. PATENT DOCUMENTS

| | | |
|---|---|---|
| 7,015,823 B1 | 3/2006 | Gillen et al. |
| 7,021,146 B2 | 4/2006 | Nash et al. |
| 7,030,974 B2 | 4/2006 | Spirin et al. |
| 7,045,730 B2 | 5/2006 | Hollar et al. |
| 2001/0033012 A1 | 10/2001 | Kommerling et al. |
| 2001/0056542 A1 | 12/2001 | Cesana et al. |
| 2002/0191788 A1 | 12/2002 | Inchalik et al. |
| 2002/0199111 A1 | 12/2002 | Clark et al. |
| 2003/0014643 A1 | 1/2003 | Asami et al. |
| 2003/0160155 A1* | 8/2003 | Liess .......................... 250/221 |
| 2004/0099797 A1* | 5/2004 | Endicott .................... 250/221 |
| 2005/0151069 A1* | 7/2005 | Beinhocker ............ 250/227.15 |

FOREIGN PATENT DOCUMENTS

| | | |
|---|---|---|
| EP | 0142013 | 5/1985 |
| EP | 0509567 | 10/1992 |
| EP | 0972632 | 1/2000 |
| EP | 1045352 | 10/2000 |
| EP | 1273997 | 1/2003 |
| WO | 9502742 | 1/1995 |
| WO | 9738364 | 10/1997 |
| WO | 0123980 | 4/2001 |

\* cited by examiner

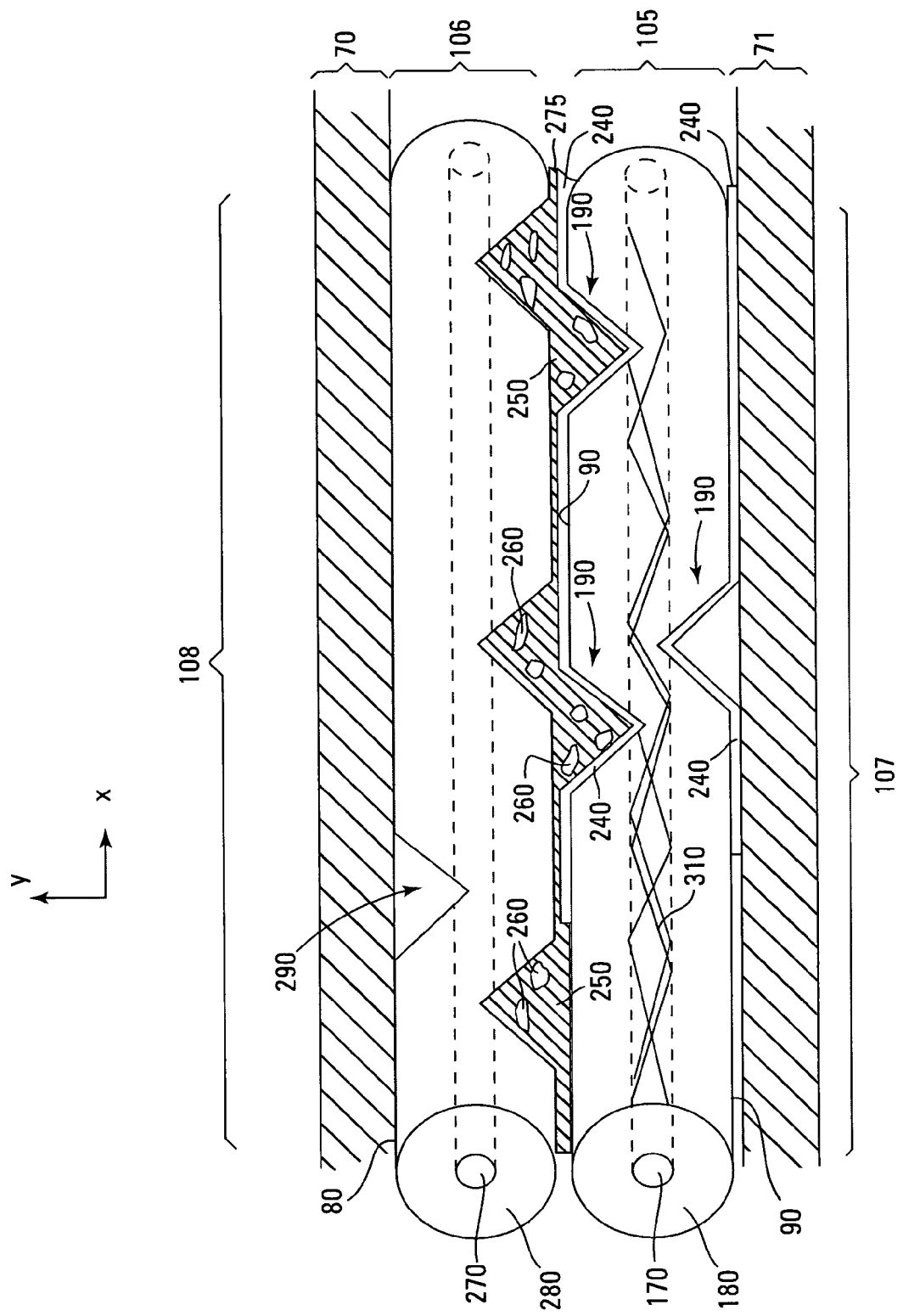

METHOD AND SYSTEM TO DETECT TAMPERING USING LIGHT DETECTOR

GOVERNMENT LICENSE RIGHTS

The U.S. Government may have certain rights in the present invention as provided for by the terms of Government Contract # FA8650-04-C-8011 awarded by the United States Air Force This application is related to an application 11/325,732 having filed on the same date herewith. The application 11/325,732 is herein incorporated by reference.

BACKGROUND

The board layout and assorted microchips which comprise electrical and electro-optical systems within boxes or chassis often include proprietary circuit designs, source code, or encryption codes which need to be protected from reverse engineering or tampering. In order to protect the proprietary circuits from tampering, the board and chip manufacturers use various technologies including sealing the chips in an opaque or tamper resistant material, installing proprietary encryption code, or adding limited chassis or cover protection which could include security seals, or mechanical cut-off switches. However, over the last decade, these technologies, and anti-tamper coatings are not effective against more intrusive technologies and advanced software tools used by reverse engineers to determine how a particular board or device works or hack into the software or software codes. For example, reverse engineers drill small holes in the chassis and insert endoscope probes to view the proprietary contents of the chassis. They can also shine X-rays on individual die to find which cells are "OFF" while others are "ON." This provides a decoding mechanism for the reverse engineer.

If the information that a reverse engineer obtains by reverse engineering proprietary boards and/or chips is related to advanced military applications, the information leak may endanger national security. In particular if the military is not aware of the leak, confidential information could become available to the reverse engineer in the future, without the military knowing that their information is compromised. Additionally, the reverse engineer may be able invent ways to overcome the proprietary technology yielding the technology ineffective for its intended use.

If the information that a reverse engineer obtains by reverse engineering proprietary boards and/or chips is related to commercial applications, the information leak could be used to undermine the economic security of the commercial vendor. If a commercial vendor is unaware of the transgression on their proprietary information, they are unable to take steps to impose a penalty or to obtain financial restitution.

For the reasons stated above and for other reasons stated below which will become apparent to those skilled in the art upon reading and understanding the specification, there is a need in the art for protecting proprietary boards and chips and for alerting a vendor or customer if the proprietary information is breached. In some cases in order to keep the proprietary information away from reverse engineers, it is desirable to destroy the proprietary boards and chips if a tampering event occurs.

SUMMARY

The embodiments of the present invention provide methods and systems for an optical anti-tamper system and will be understood by reading and studying the following specification.

One aspect of the present invention provides an optical anti-tamper system including a light emitting layer located within a chassis, a light detecting layer located within the chassis and one or more detectors optically coupled to the light detecting layer. The one or more detectors are in communication with an alarm. The alarm is operable to transmit a tamper-event warning signal if an increased light level is detected by at least one detector.

Another aspect of the present invention provides a method of manufacture. The method includes positioning at least one light emitting layer within a chassis, positioning at least one light detecting layer within the chassis operable to receive light from at least one light emitting layer, positioning at least one opaque layer to prevent light from propagating from the light emitting layers to any one of the light detecting layers and connecting an alarm in communication with one or more detectors correlated to the light detecting layer.

Another aspect of the present invention provides a method to detect a tampering event. The method includes breaking an opaque layer so that the break is located between a light emitting layer and a light detecting layer within the chassis, transmitting light through a portion of a light detecting layer responsive to breaking the opaque layer, detecting an increase in a light level at one or more detectors responsive to the transmitting light and generating a tamper-event warning signal responsive to the detecting.

Another aspect of the present invention provides An optical anti-tamper system. The system includes means for detecting an increased light level within the chassis responsive to cutting a light emitting layer and an adjacent a light detecting layer that are both located within the chassis near a protected component and means for generating tamper-event warning signal responsive to the detecting.

DRAWINGS

Embodiments of the present invention can be more easily understood and further advantages and uses thereof more readily apparent, when considered in view of the description of the preferred embodiments and the following figures.

FIG. 3 is an enlarged view of an emitter optical fiber in the light emitting layer of FIG. 1A positioned adjacent to an a detector optical fiber in the light detecting layer of FIG. 1B in accordance with an embodiment of the present invention.

In accordance with common practice, the various described features are not drawn to scale but are drawn to emphasize features relevant to the present invention. Reference characters denote like elements throughout figures and text.

DETAILED DESCRIPTION

Figure 1:
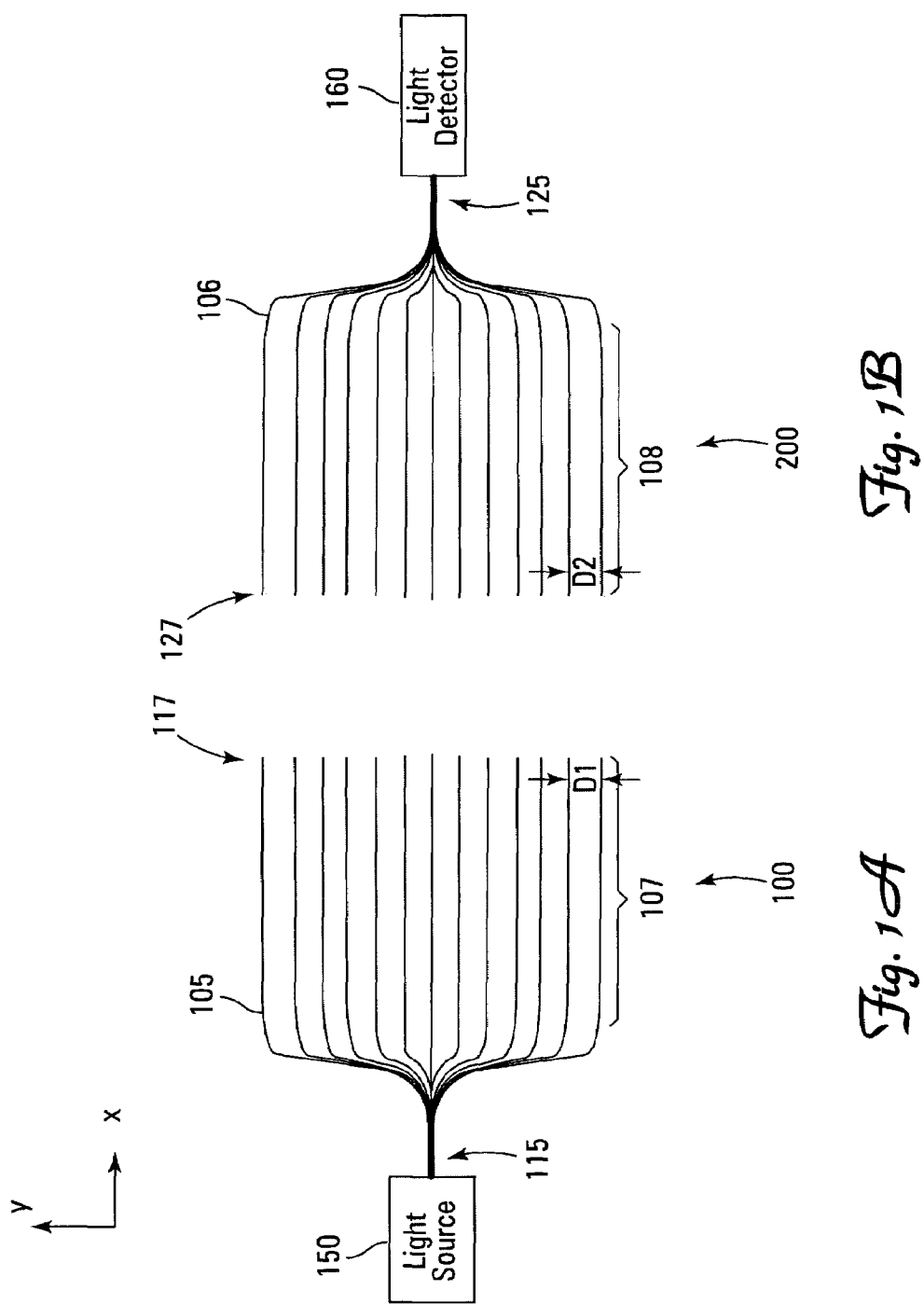
FIG. 1A is a top-view of an embodiment of a light emitting layer optically coupled to a light source.
FIG. 1B is a top-view of an embodiment of a light detecting layer optically coupled to a light detector.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Various implementations of embodiments of optical anti-tamper systems are described herein. Each of the described optical anti-tamper systems is located within a chassis and includes a light emitting layer and a light detecting layer positioned within a line of sight with each other. During a tampering event, one or more detectors in communication with the light detecting layer detect an increase in light level as a result of the tampering. An alarm in communication with the detector transmits a tamper-event warning signal in response to the increased light level at the detector.

A tampering event, as defined herein, occurs when a component to be protected is viewed and/or touched by a person or an object. A chassis-opening tampering event, occurs when a person opens a chassis, in which the protected component is enclosed, in order to analyze the component. An opaque-layer-break tampering event occurs when a person or object touches or probes the protected component in order to analyze the component. FIGS. 1-4 and 6-9 illustrate views (or partial views) of implementations of an embodiment of an optical anti-tamper system.

FIG. 1A is a top-view of an embodiment of a light emitting layer 100 optically coupled to a light source 150. The light emitting layer 100 includes a plurality of emitter optical fibers designated generally as 105. As shown in FIG. 1A, the input ends generally designated as 115 of the emitter optical fibers 105 are bundled for optical coupling to one or more light sources represented as a single light source 150. In this manner, one or more light sources 150 are optically coupled to the light emitting layer 100. The output ends generally designated as 117 of the emitter optical fibers 105 are spatially separated by the distance D1.

A main body region generally designated as 107 of each of the emitter optical fibers 105 lies in a straight line. The main body regions 107 of neighboring emitter optical fibers 105 are separated by approximately equal distances D1. The main body region 107 ends at the output ends 117 of the emitter optical fiber 105. In one implementation of the embodiment of emitter optical fiber 105, the main body region 107 is about half the length of the emitter optical fiber 105. In another implementation of the embodiment of emitter optical fibers 105, the main body regions 107 range from between half the length of the respective emitter optical fiber 105 and three-quarters of the length of the respective emitter optical fiber 105. The main body regions 107 of emitter optical fibers 105 lie approximately in a plane defined by vectors X and Y. Additional physical details of embodiments of the emitter optical fibers 105 are described below with reference to FIGS. 2 and 3.

FIG. 1B is a top-view of an embodiment of a light detecting layer 200 optically coupled to a light detector 160. The light detecting layer 200 includes a plurality of detector optical fibers generally designated as 106. As shown in FIG. 1B, the output ends generally designated as 125 of the of detector optical fibers 106 are bundled for optical coupling to one or more light detectors represented as a single light detector 160. In this manner, one or more light detectors 160 are optically coupled to the light detecting layer 200 so that the light detector 160 is optically coupled to receive light that propagates through any of the detector optical fibers 106. The input ends generally designated as 127 of the of detector optical fibers 106 are spatially separated by the distance D2.

A main body region 108 of each of the detector optical fibers 106 lies in a straight line. The main body regions 108 of neighboring detector optical fibers 106 are separated by approximately equal distances D2. The main body region 108 ends at the input ends 127 of the detector optical fiber 106. In one implementation of the embodiment of detector optical fiber 106, the main body region 108 is about half the length of the detector optical fiber 106. In another implementation of the embodiment of detector optical fiber 106, the main body region 108 from between half the length of the respective detector optical fiber 106 and three-quarters of the length of the respective detector optical fiber 106.

The main body regions 108 of detector optical fibers 106 lie approximately in the plane defined by vectors X and Y. Additional physical details of embodiments of the detector optical fibers 106 are described below with reference to FIG. 3. In one implementation of embodiments of light emitting layer 100 and light detecting layer 200, the distance D1 is about 1.5 to 3 times the diameter of the detector optical fiber 106 and the distance D2 is about 1.5 to 3 times the diameter of the emitter optical fiber 105. In another implementation of embodiments of light emitting layer 100 and light detecting layer 200, the distance D1 is about equal to the distance D2.

Figure 2:
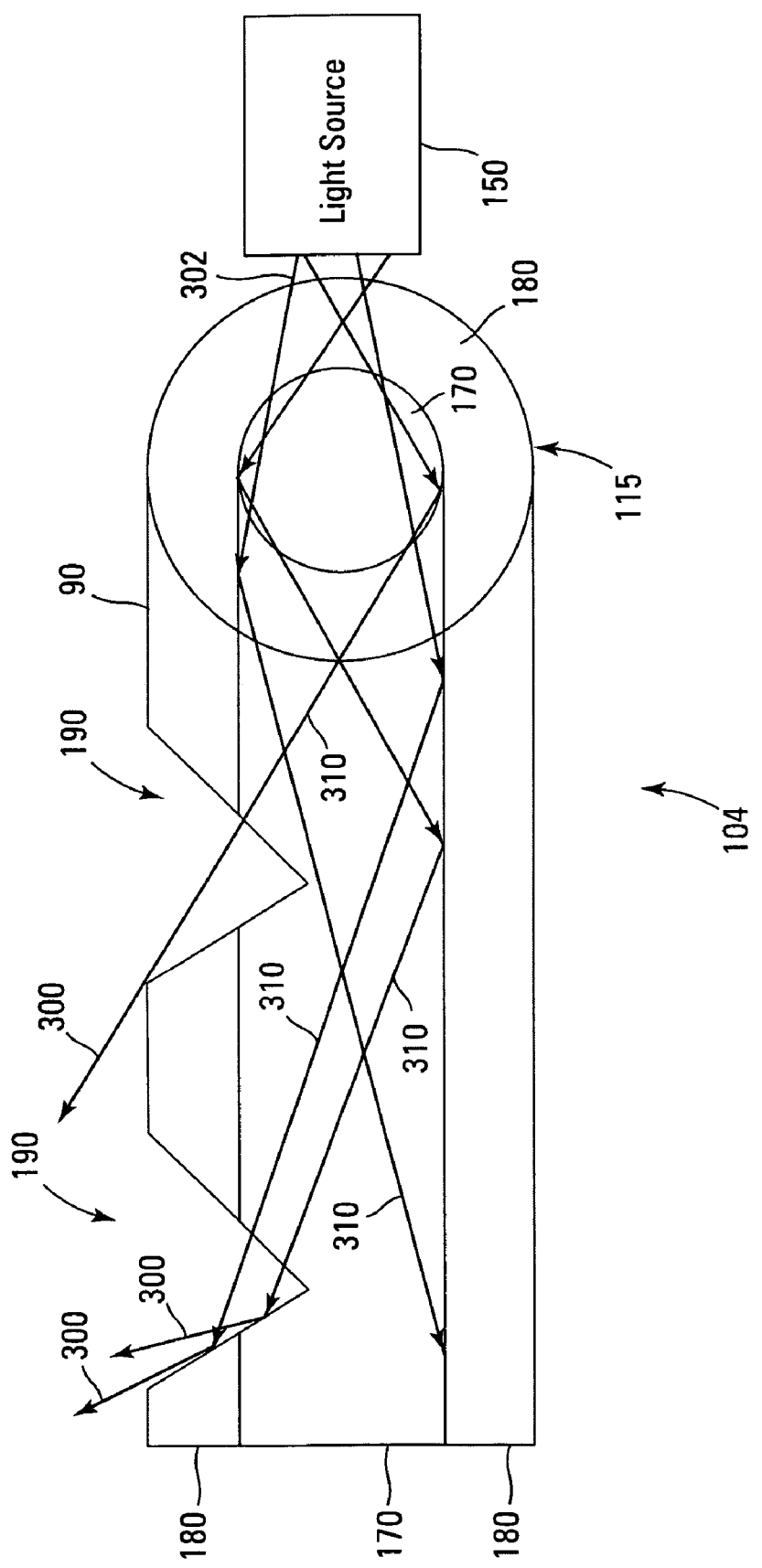
FIG. 2 is an enlarged view of an uncoated emitter optical fiber.

FIG. 2 is an enlarged view of an uncoated emitter optical fiber 104. In an embodiment of the present invention illustrated in FIGS. 11-14, a plurality of uncoated emitter optical fibers 104 form the light emitting layer 100. The emitter optical fiber 105 is formed by coating at least the bevel cuts 190 of the uncoated emitter optical fibers 104 with a thin film opaque layer. In the embodiment of the present invention illustrated in FIGS. 3-8, the emitter optical fibers 105 form the light emitting layer 100.

As shown in FIG. 2, the input end 115 of an emitter optical fiber 104 receives light emitted from the light source 150. The emitted light 302 diverges from the light source 150 into more than one direction of propagation. The emitted light 302 is coupled into the core 170 of the emitter optical fiber 104 at the input end 115. The side surface 90 of the emitter optical fiber 104 is the outer surface of the cladding 180 of emitter optical fiber 104. The side surface 90 has bevel cuts 190 that extend through the cladding 180 and into the core 170 of the emitter optical fiber 104. A portion of the light 310 propagating through the emitter optical fiber 104 is incident on a bevel cut 190 and is propagated outside the emitter optical fiber 104 as light 300. In this manner, the bevel cuts 190 operate as output ports on a side surface of an emitter light pipe, since the bevel cuts 190 are operable to transmit light 310 propagating through the emitter optical fiber 104 outside the side surface 90 of the emitter optical fiber 104.

FIG. 3 is an enlarged view of an emitter optical fiber 105 in the light emitting layer 100 of FIG. 1A positioned adjacent to an a detector optical fiber 206 in the light detecting layer 200 of FIG. 1B in accordance with an embodiment of the present invention. The emitter optical fiber 105 is the emitter optical fiber 104 of FIG. 2 at least partially covered with a thin film opaque layer 240.

The main body region 107 of an emitter optical fiber 105 is shown adjacent to the main body region 108 of a detector optical fiber 106. As shown in FIG. 3, the emitter optical fiber 105 has a thin film opaque layer 240 covering at least the bevel cuts 190 and also a portion of the side surface 90 for the emitter optical fiber 105. As in FIG. 2, the light 310 is propagating in the core 170 of the emitter optical fiber 105. The thin film opaque layer 240 that coats the bevel cut 190 is designed to absorb, scatter and/or reflect the one or more wavelengths of the light 310 that propagate in the emitter optical fibers 105 and the detector optical fibers 106. In this manner, the thin film opaque layer 240 prevents the light 310 that is propagating through the emitter optical fiber 105 from being transmitted outside the side surface 90 of the emitter optical fiber 105. The terms "opaque layer" and "thin film opaque layer" are used interchangeably throughout this document.

The side surface 80 of the detector optical fiber 106 is the outer surface of the cladding 280 of the detector optical fiber 106. The side surface 80 has bevel cuts 290 that extend through the cladding 280 and into the core 270 of the detector optical fiber 106. There is not a thin film opaque layer 240 covering the bevel cuts 290 or the side surface 80 for the detector optical fiber 106.

A transparent abrasive layer 275 includes a gel 250 and abrasive particles 260 dispersed within the gel 250. The transparent abrasive layer 275 is located at the interface between the emitter optical fiber 105 and the detector optical fiber 106. The gel 250 is viscous and the transparent abrasive particles 260 are solid particles with one or more sharp edges. In one implementation of this embodiment, the transparent abrasive layer is replaced with a transparent layer that does not include abrasive particles 260.

Also shown in FIG. 3 is a top reflective surface 70 and a bottom reflective surface 71. The top reflective surface 70 and a bottom reflective surface 71 surround the emitter optical fiber 105 and the detector optical fiber 106.

This relative positioning of the emitter optical fiber 105 covered at least in the bevel cuts 190 by the thin film opaque layer 24, the detector optical fiber 106 with bevel cuts 290, gel 250 filled with the abrasive particles 260 all surrounded by the top reflective surface 70 and the bottom reflective surface 71 make the emitter optical fiber 105 and the detector optical fiber 106 suitable for operation in an embodiment of an optical anti-tamper system 12 (FIG. 4).

Figure 4A:
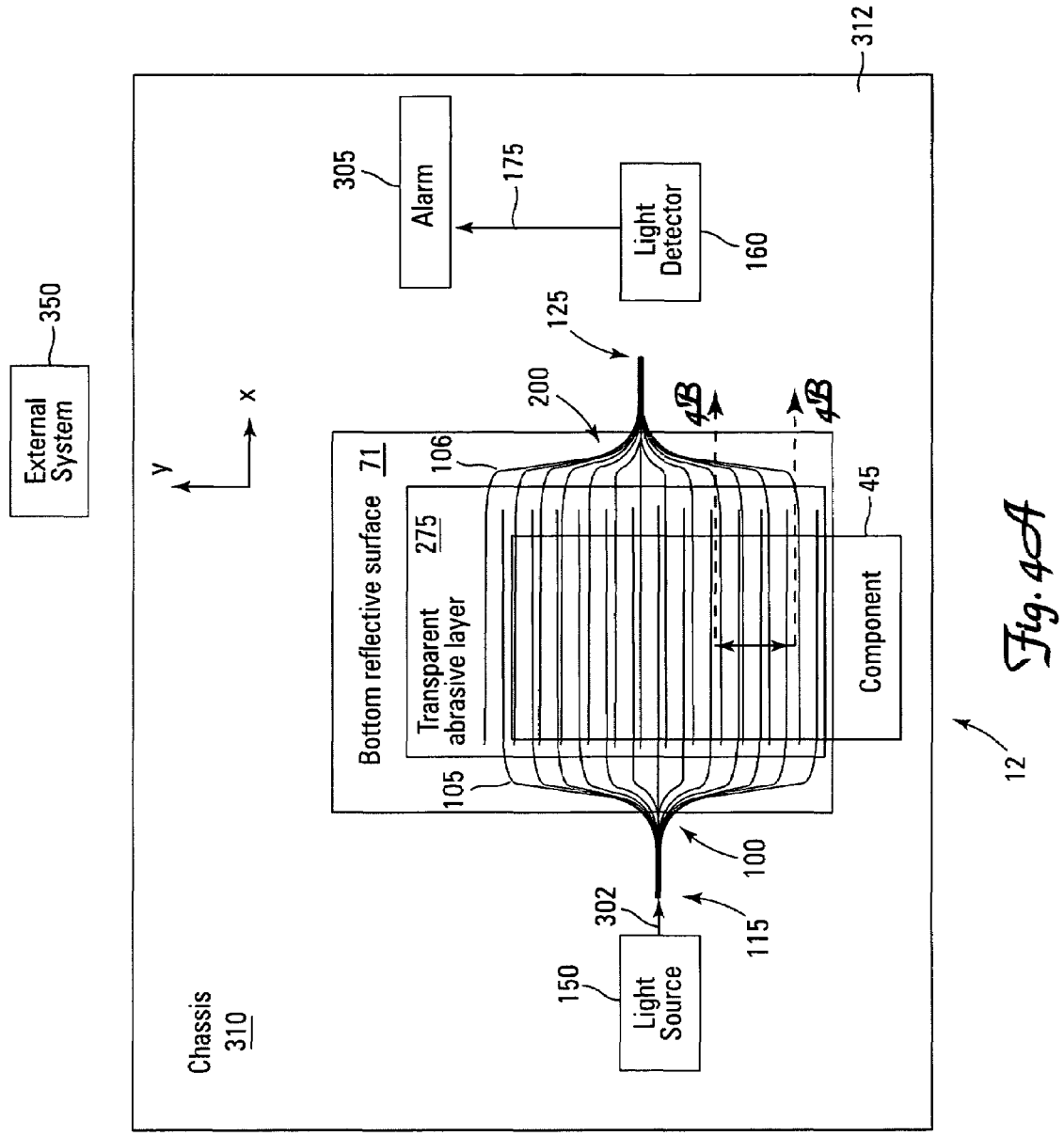
FIG. 4A is a top-view of an embodiment of the optical anti-tamper system.
Figure 4B:
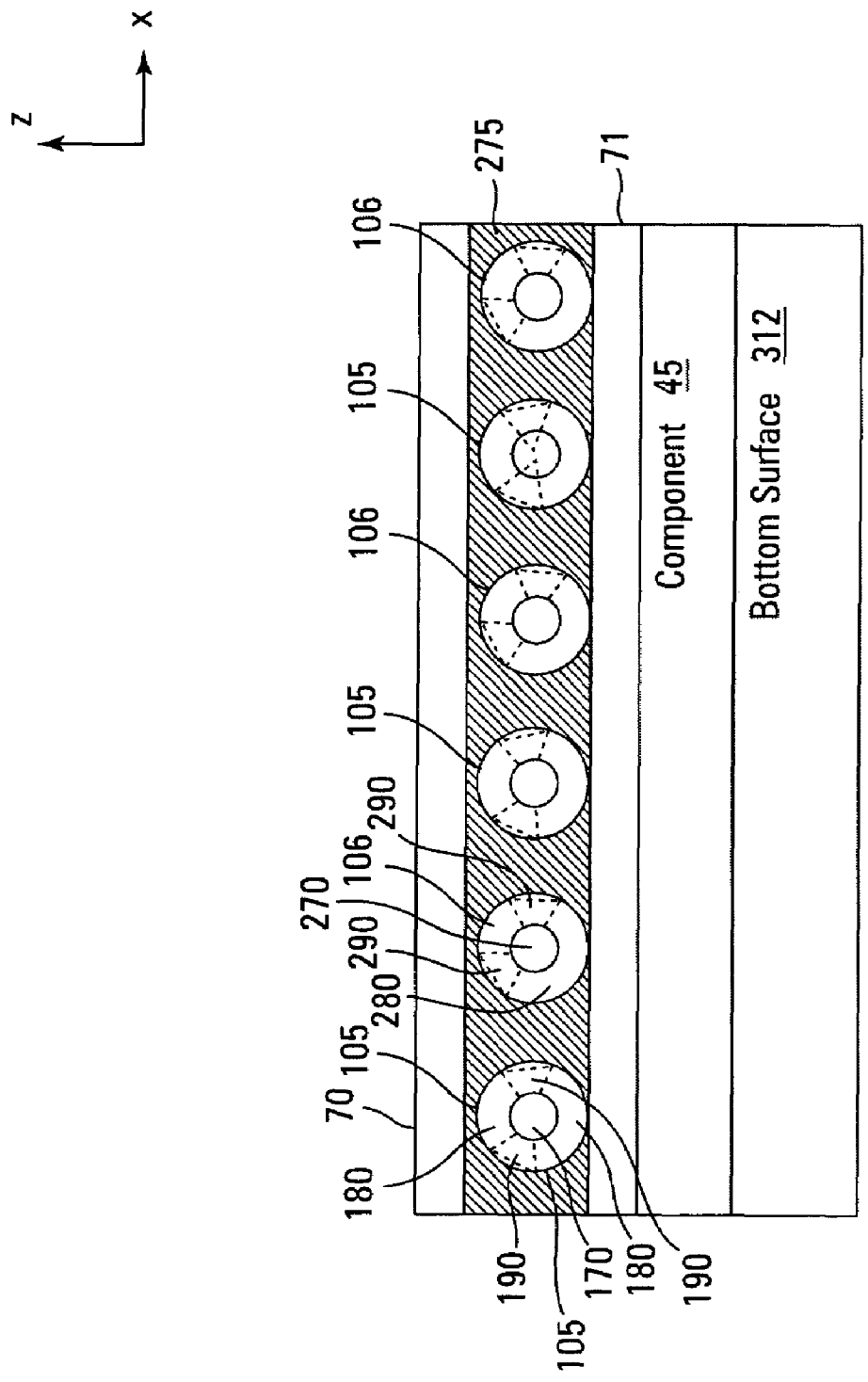
FIG. 4B is an enlarged cross-sectional view of side view of a portion of the optical anti-tamper system of FIG. 4A.

FIG. 4A is a top-view of an embodiment of the optical anti-tamper system 12. The plane upon which the cross-section view of FIG. 4B is taken is indicated by section line 4B-4B in FIG. 4A. FIG. 4B is an enlarged view of side view of a portion of the optical anti-tamper system 12 of FIG. 4A. The optical anti-tamper system 12 includes the light emitting layer 100, the light detecting layer 200, the transparent abrasive layer 275, light source 150, light detector 160, the top reflective surface 70 (not visible from this cross-sectional top-view), the bottom reflective surface 71 and an alarm 305 enclosed within a chassis 310 and in contact with a proprietary part of component 45 that is to be protected from a tampering event. The emitter optical fibers 105 of light emitting layer 100 are interleaved with the detector optical fiber 106 of the light detecting layer 200. The optical anti-tamper system 12 operates to detect a tampering event. When an object or persons touches the interleaved light emitting layer 100 and light detecting layer 200 as it overlies at least a portion of the component 45 the thin film opaque layer 24 breaks in an opaque-layer-break tampering event.

As described above with reference FIG. 1A, the emitter optical fibers 105 are optically coupled at input ends 115 to receive light 302 emitted from the light source 150. As described above with reference to FIG. 1B, the light detector 160 is optically coupled to receive any light propagating in the detector optical fiber 106. The emitter optical fiber 105, including the bevel cuts 190 covered by the thin film opaque layer 24, the detector optical fiber 106 with bevel cuts 290, gel 250 filled with the abrasive particles 260 are positioned as described above with reference to FIG. 3. In this embodiment, the bottom reflective surface 71 lies adjacent to and below the light emitting layer 100 and the light detecting layer 200 while the top reflective surface 70 (FIG. 4B) lies adjacent to and above the light emitting layer 100 and the light detecting layer 200. Top reflective surface 70 and bottom reflective surface 71 lie in a plane parallel to the plane defined by the vectors X and Y. The bottom reflective surface 71 overlies the bottom surface 312 of the chassis 310.

The detector 160 is in communication with alarm 305 as indicated by arrow 175 (FIG. 4A). The alarm 305 is operable to transmit a tamper-event signal to an external system 350 if an increased light level is detected by detector 160. The external system 350 is external to the chassis 310 (FIG. 4A). The component 45, shown in FIGS. 4A and 4B as one component, is representative of one or more components. The portion of the component 45 covered by the light emitting layer 100 and the light detecting layer 200 includes the proprietary technology.

In one implementation of an embodiment of the optical anti-tamper system 12, the light source 150 includes more than one light source. In another implementation of an embodiment of the optical anti-tamper system 12, the light source 150 includes a plurality of light sources emitting at more than one wavelength. In yet another implementation an embodiment of the optical anti-tamper system 12, the light source 150 is optically coupled to the emitter optical fibers 105 with an optical lens system. The light source 150 can be light emitting diodes, edge emitting laser diodes, vertical cavity surface emitting diodes, gas lasers, or other light source capable of coupling to the light emitting layer 100.

In one implementation of the embodiments of the light detecting layer 200, the light detector 160 is operable to detect low levels of light. The light detector 160 does not need to detect light at high data rates and thus, is not required to be a high speed detector. Therefore, light detector 160 is relatively inexpensive slow detector and/or large area detector. The light detector 160 is operable to detect visible light. In one implementation of this embodiment of the light detecting layer 200, the light detector 160 senses wavelengths in one or more of the infra-red spectral range, the red spectral range, the blue-green spectral range and the ultra-violet spectral range. In another implementation of this embodiment of the light detecting layer 200, the light detector 160 is a plurality of light sensors and each light detector senses a different range of wavelengths. In yet another implementation of this embodiment, the light detector 160 includes a first plurality of light detectors that sense a first range of wavelengths and a second plurality of light detectors that sense a second range of wavelengths.

The emitter optical fibers 105 and detector optical fibers 106 can be glass optical fiber, plastic optical fibers, multi-mode optical fiber, single mode optical fiber, and any flexible light pipe. For a given application and/or customer, the selection of optical fiber type and the optical fiber form can be optimized to meet the durability requirements, anti-tamper requirements, and cost requirements for specific components 45 being protected. The phrase "optical fiber" and "light pipe" are used interchangeably throughout this document.

The alarm 305 includes circuits, such as digital IC or analog IC, that are operable to perform the functions of the alarm 305 as described below with reference to method 900 of FIG. 9. In one implementation of the optical anti-tamper system 12, the alarm 305 includes a processor operable to execute software and/or firmware that causes the processor to perform at least some of the processing described here as being performed by the optical anti-tamper system 12. At least a portion of such software and/or firmware executed by the processor and any related data structures are stored in memory during execution. In one implementation of the optical anti-tamper system 12, the alarm 305 includes a processor and a memory, which comprises any suitable memory now known or later developed such as, for example, random access memory (RAM), read only memory (ROM), and/or registers within the processor.

In one implementation of this embodiment of the optical anti-tamper system 12, the light detector 160 is fixed to a surface of a board located in the chassis 310. In another implementation of this embodiment of the optical anti-tamper system 12, the top reflective surface 70 and the bottom reflective surface 71 are not included. In yet another implementation of this embodiment of the optical anti-tamper system 12, the components 45 include an electronic circuit board.

FIG. 3 shows an emitter optical fiber 105 and detector optical fiber 106 in an unbroken state in which the thin film opaque layer 240 is unbroken. FIG. 4A is a cross-sectional top-view of the optical anti-tamper system 12 in an unbroken state and no light from the emitter optical fiber 105 is transmitted to the detector optical fiber 106. When the optical anti-tamper system 12 is touched by a person or an object, the thin film opaque layer 240 is broken by the abrasive particles 260 in the transparent abrasive layer 275 and light 310 from the emitter optical fiber 105 is transmitted to the detector optical fiber 106.

Figure 5:
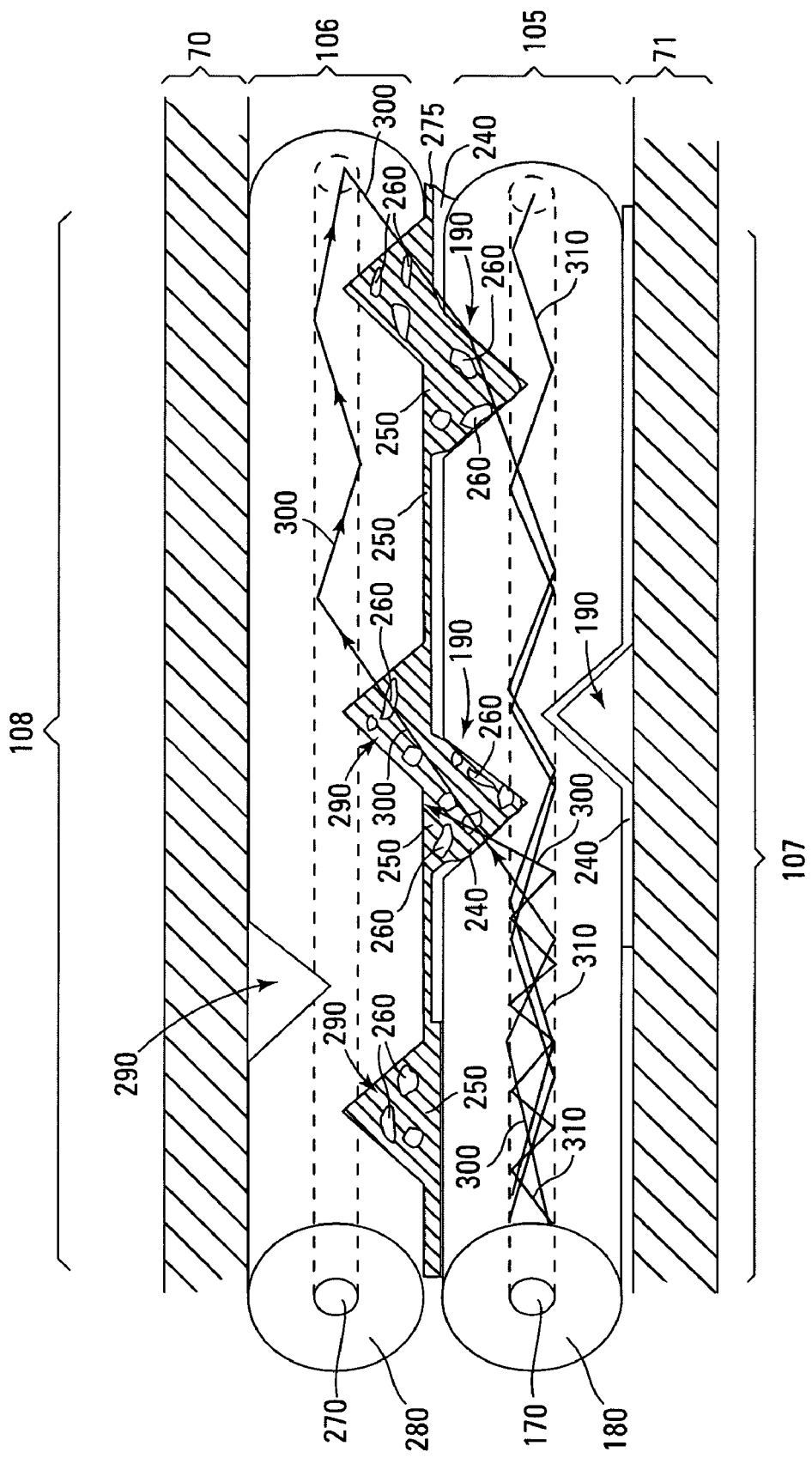
FIG. 5 is an enlarged view of an emitter optical fiber and a detector optical fiber of FIG. 3 in a broken state.
Figure 6:
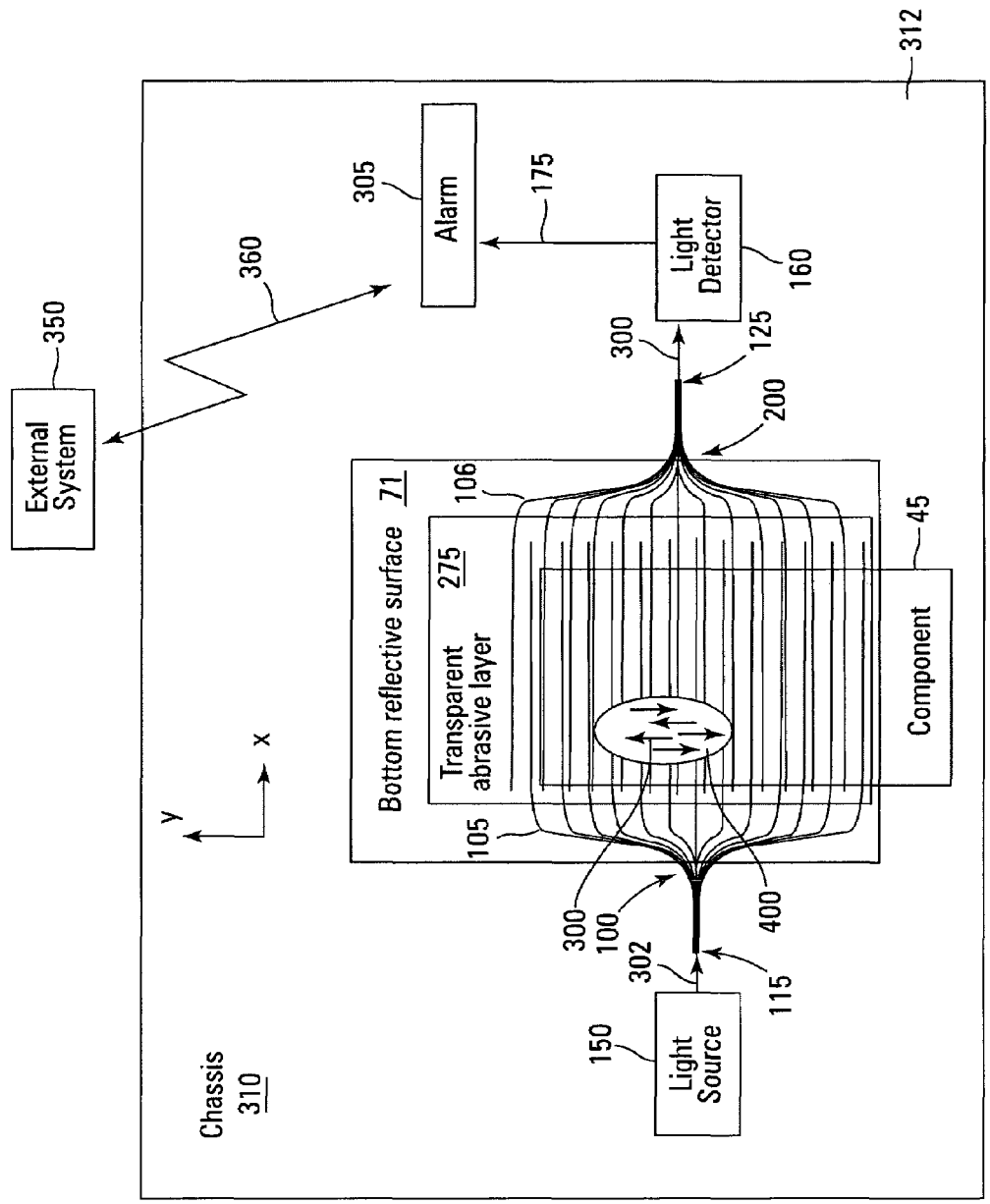
FIG. 6 is a top-view of an embodiment of the optical anti-tamper system 12 of FIG. 4A and 4B in a broken state.
Figure 7:
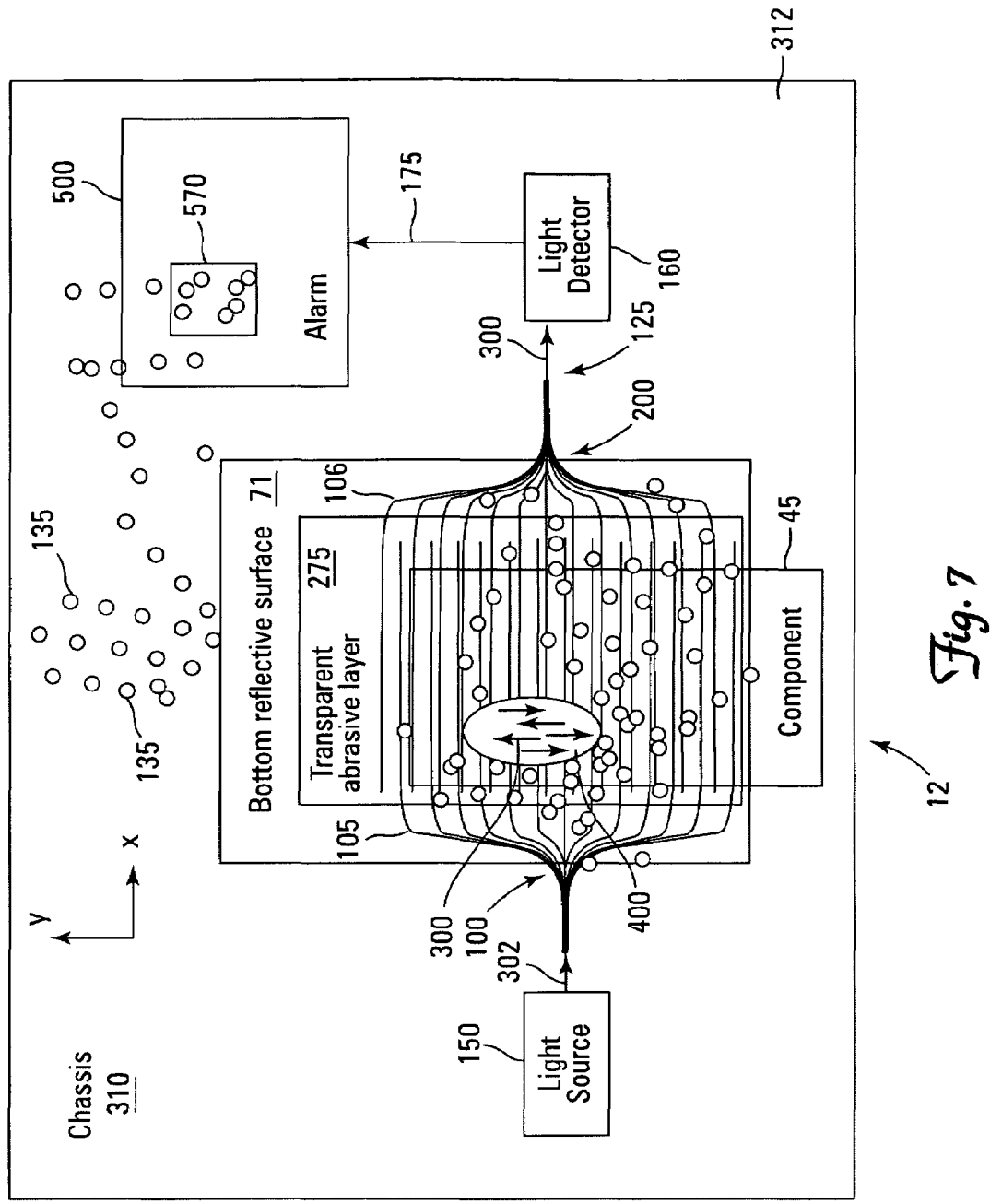
FIG. 7 is a top-view of an embodiment of the optical anti-tamper system 12 of FIG. 4A and 4B in a broken state.
Figure 8:
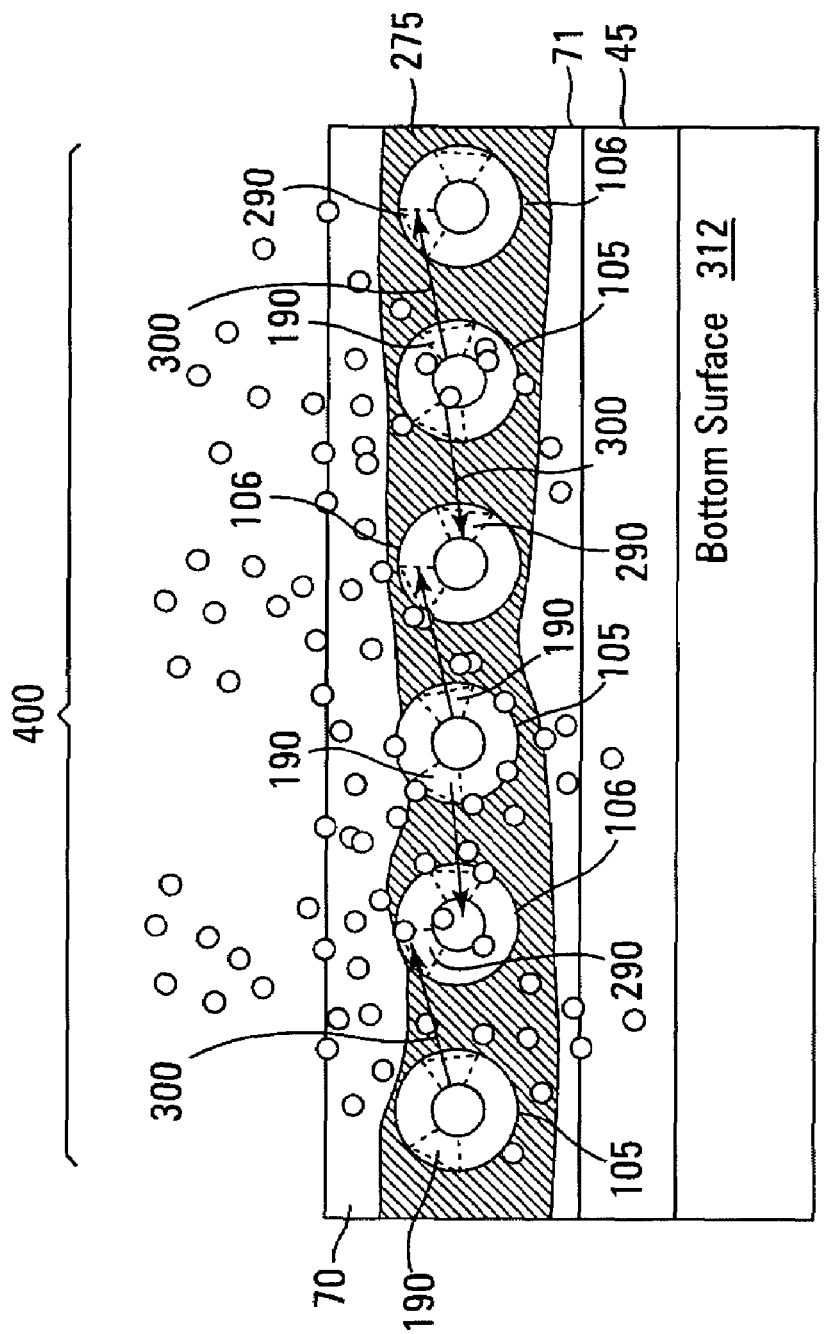
FIG. 8 is an enlarged cross-sectional side view of a portion of the embodiment of the optical anti-tamper system of FIG. 7 in the broken state.

FIG. 5 is an enlarged view of an emitter optical fiber 105 and detector optical fiber 106 of FIG. 3 in a broken state. The emitter optical fiber 105 and detector optical fiber 106 are in a broken state after the transparent abrasive particles 260 are pushed against the thin film opaque layer 240 in the bevel cut 190 and break the thin film opaque layer 240. FIG. 6 is a top-view of an embodiment of the optical anti-tamper system 12 of FIGS. 4A and 4B in a broken state. In FIG. 6, the optical anti-tamper system 12 is in the process of transmitting a tamper-event warning signal 360. Light 300 that passed through the break in the thin film opaque layer 240 was coupled into the core 270 and an increased level of light was detected at the light detector 160. In FIG. 6, a radio frequency tamper-event warning signal 360 is being transmitted to an external system 350. FIG. 7 is a top-view of an embodiment of the optical anti-tamper system in a broken state. In FIG. 7, the alarm 500 replaces the alarm 350 and the proprietary components 45 are being damaged by material 135 that contacts the components 45 in response to a tampering event. FIG. 8 is an enlarged cross-sectional side view of a portion of the embodiment of the optical anti-tamper system of FIG. 7 in the broken state.

Figure 9:
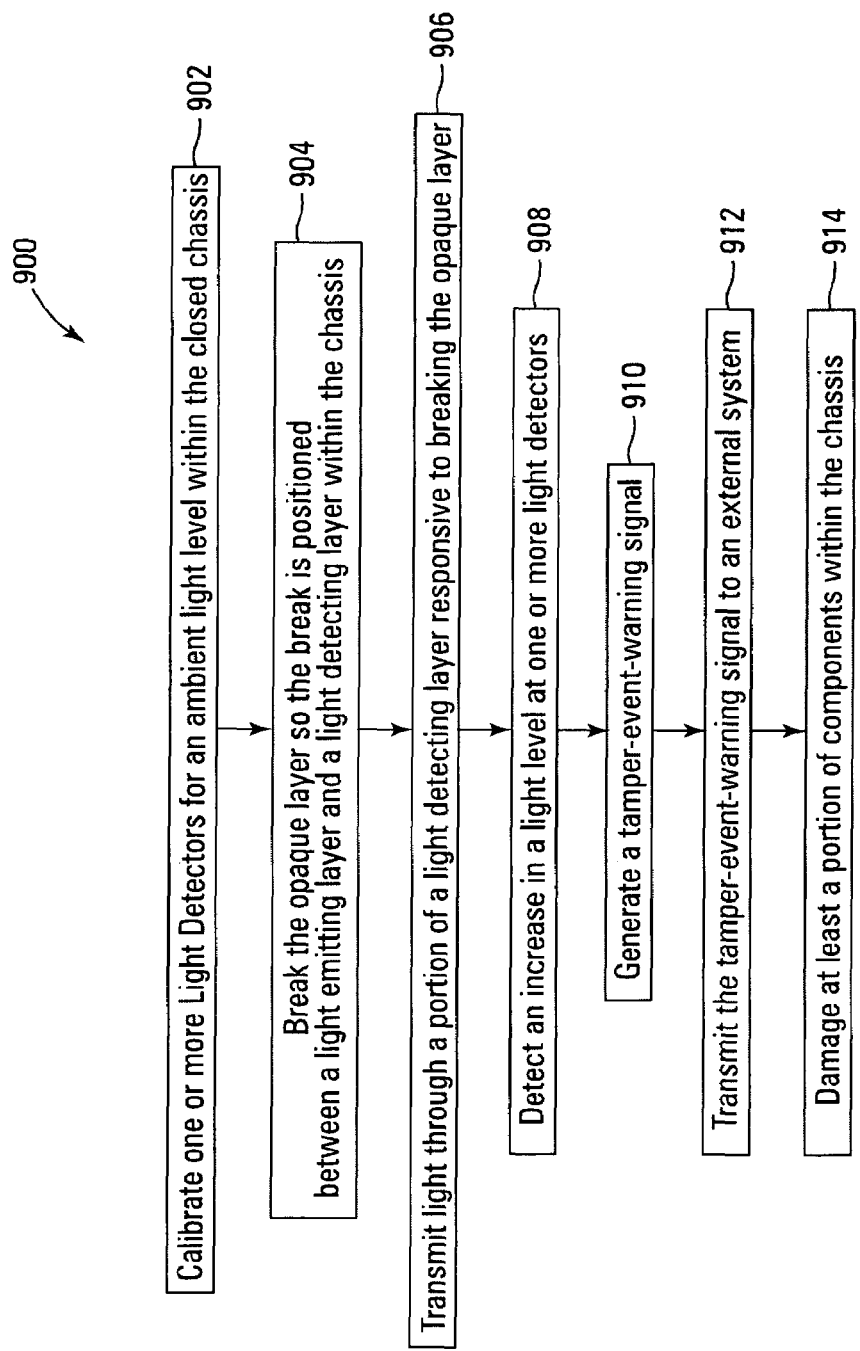
FIG. 9 is an embodiment of a method to detect a tampering event of a component within a chassis of the present invention.

FIG. 9 is a method 900 to detect a tampering event of a component 45 within a chassis 310 in one embodiment of the present invention. The method 900 is described with reference to the optical anti-tamper system 12 as illustrated in FIGS. 5-8. The alarm 305 has stored in computer readable medium at least one computer program including computer readable code to perform the operations described with reference to method 900.

The one or more light detectors 160 of the optical anti-tamper system 12 are calibrated for the ambient light level in the closed chassis 310 (block 902). The optical anti-tamper system 12 is positioned as shown in FIGS. 4A and 4B. The chassis 310 is sealed to prevent any light from external to the chassis 310 from entering the chassis. There may be one or more light sources within the chassis 310 for normal operation of the components 45. In one implementation of the exemplary optical anti-tamper system 12 of FIGS. 4A and 4B, the components 45 include light emitting diodes. Once the chassis 310 is closed, the alarm 305 is triggered to receive signals from the light detector 160. The signals indicate a light level in the chassis 310 that is the calibrated light level. In another implementation of the exemplary optical anti-tamper system 12 of FIGS. 4A and 4B, a processor external to the alarm 305 triggers the alarm 305 to calibrate the optical anti-tamper system 12.

At block 904, a touch on the optical anti-tamper system 12 breaks the thin film opaque layer 240 (in one or more places) in response to a tampering event. The break in thin film opaque layer 240 is positioned between the light emitting layer 100 and the light detecting layer 200 within the chassis 310 so that light 300 is transmitted from the light emitting layer 100 to the light detecting layer 200.

When the optical anti-tamper system 12 is touched, the transparent abrasive particles 260 are pushed through the viscous gel 250 against the thin film opaque layer 240 in the bevel cut 190. The sharp edges of the transparent abrasive particle 260 cut and tear the thin film opaque layer 240 to break open the thin film opaque layer 240 within at least one bevel cut 190.

The light 310 propagating in emitter optical fiber 105 that is incident on the bevel cut 190 in the area where the thin film opaque layer 240 is broken is transmitted as light 300 through the opening the thin film opaque layer 240 into and through the transparent abrasive layer 275. As shown in FIG. 5, the portion of the light 300 that is incident on the bevel cut 290 is coupled from the transparent abrasive layer 275 into the core 270 of the detector optical fiber 106. Once the light 300 is coupled into the core 270 it propagates through at least one detector optical fiber 106 in the light detecting layer 200 towards the light detector 160 (block 906). As shown in FIGS. 6-8, light 300 in a touched area 400 is propagating through the transparent abrasive layer 275 from the emitter optical fibers 105 to detector optical fibers 106. Specifically as illustrated in FIG. 8, the light 300 is emitted from the bevel cuts 190 (defined herein as output ports on a side surface of an emitter light pipe) and transmitted through the transparent abrasive layer 275 to the bevel cuts 290 (defined herein as input ports on a side surface of a detector light pipe). FIG. 8 shows the viscous transparent abrasive layer 275 as the thin top reflective layer 70 overlaying the transparent abrasive layer 275 is pushed downward in the touched area 400. This push moves the emitter optical fiber 105 and the detector optical fiber 206 within the transparent abrasive layer 275 so that transparent abrasive particles 260 are forced into contact with the emitter optical fiber 105 and break the thin film opaque layer 240.

The light 300 is coupled from the detector optical fiber 106 into the light detector 160. The light detector 160 detects an increase in the light level from the calibrated light level in response to the light 300 being transmitted to the core 270 of the detector optical fiber 106 (block 908). As shown in FIG. 6, light 300 is coupled from the detector optical fibers 106 to the light detector 106. The light level incident on the light detector 160 is now greater than the light level incident on the light detector 160 during the calibration process described above with reference to block 902.

The alarm 305 receives the signal 175 indicative of the light incident on the light detector 160. The circuitry within the alarm 305 is operable to retrieve the calibrated light level for the calibrated light detector 160 and compare the values of the calibrated light level and the light level when light 130 is incident on the light detector 160. The alarm 305 determines that there is an increased light level based on the comparison. The alarm 305 generates a tamper-event warning signal responsive to the increased light level at light detector 160 (block 910). In this manner the, the alarm 305 generates a tamper-event warning signal in response to detecting the increased light level at light detector 160 that is correlated to the light transmitted to the light detecting layer 200.

In one implementation of the method 900, after the alarm 305 generates a tamper-event warning signal responsive to the detected increased light level, the alarm 305 in the optical anti-tamper system 11 transmits the tamper-event warning signal 360 to an external system 350 (block 912). As shown in FIG. 6, the tamper-event warning signal 360 is transmitted as a radio frequency signal 360 to the external system 350. In one implementation of this embodiment of block 912 the method 900, the radio frequency signal is generated by a transmitter. In another implementation of this embodiment of block 912 the method 900, the radio frequency signal is generated by a transceiver in the alarm 305.

The term 'tamper-event warning signal" as defined herein, includes one or more output events operable to notify one or more systems or people that the component 45 covered by an optical anti-tamper system 12 has been touched. The output events that warn of a tampering event include an audio alert, a signal transmitted to an external system 350, and a trigger of a visual indicator at an external system 350.

In another implementation of the method 900, the optical anti-tamper system 12 damages at least a portion of the components 45 in the chassis 310 (block 914) when the alarm 305 generates a tamper-event warning signal. In FIGS. 7 and 8, the optical anti-tamper system 12 is in the process of damaging at least a portion of components 45 within the chassis 310 responsive to the tamper-event warning signal. As defined herein, the term "damaging" refers to making the protected software and/or hardware inoperable and/or irretrievable.

As shown in FIG. 7, the alarm 500 includes a container 570. When the alarm 500 generates a tamper-event warning signal, the container 570 is automatically triggered by the alarm 500 to open. When the container 570 opens, a material 135 in the container is emitted and disperses within the open chassis 40. In FIGS. 7 and 8, the material 135 is indicated as a plurality of circles to represent molecules or groups of molecules of the diffusing material 135. The material 135 is operable to destroy or damage at least a portion of the components 45 that are being protected to prevent proprietary information from being retrieved from the components. In one implementation of this embodiment of block 914 of method 900, the container 570 opens due to a mechanical switch that operates responsive to the trigger. In another implementation of this embodiment of block 914 of method 900, the container 570 opens due to an electric and/or electro-optic switch that operates responsive to the trigger.

In one implementation of this embodiment of block 914 of method 900, the material 135 is a caustic chemical that erodes conformal coatings and the trace lines within and/or connecting components 45. The caustic chemical can be in a gas or liquid state. In another implementation of this embodiment of block 914 of method 900, the components 45 are powered to drive the signal lines and material 135 is a conductive substance that electrically shorts conductive trace lines and device pins connecting and/or within the circuits of the components 45. In this embodiment, the material 135 does not short the power and ground connections of the component 45 powered to drive the signal lines while shorting the output drivers of functional circuits within the components 45. In yet another implementation of this embodiment of block 914 of method 900, more than one material is emitted and dispersed within the chassis 40. In yet another implementation of this embodiment of block 914 of method 900, more than one material is emitted and dispersed within the chassis 40 to form a third material 135 that damages or destroys at least the proprietary components within the chassis 40.

In one implementation of an opaque-layer-break tampering event, a relative movement between two or more components within the chassis 310 causes the two or more components 45 to touch each other. When the two components 45 touch each other, the abrasive particles 260 in the transparent abrasive layer 275 that overlie at least a section of the opaque layer 240 break at least a portion of the opaque layer 240. In an exemplary case, a plurality of boards in one chassis 310 hold protected components 45. If the chassis 310 is opened and a board is removed, the board being removed can inadvertently the touching another board. When a first board touches against an optical anti-tamper system 12 on a second board, the alarm 305 generates a tamper-event warning signal. In another implementation of the optical anti-tamper system 12, the optical anti-tamper system 12 is located adjacent to the protected components 45 in a place within the chassis 310 that is touched by someone who opens the chassis 310 to inspect the components 45.

In this manner, optical anti-tamper system 12 and all the implementations of the embodiments described herein are operable to break an opaque layer responsive to a touching of one or more components within a chassis, to detect an increased light level within the chassis responsive to the break and to generate tamper-event warning signal responsive to the detecting.

In a closed state the chassis 310 is impenetrable to light. During a chassis-opening tampering event, a person opens the chassis 310 in an area with external ambient light from an external light source. The light enters the chassis 310 and the light detector 160 detects an increase in light level. The light does not propagate through the detector optical fiber 106 but is directly incident on the light detector 160. The alarm 305 generates a tamper-event warning signal responsive to the increased light level. If a person opens the chassis 310 in the dark there is no tamper-event warning signal responsive to opening the chassis 310, however, if the person then touches the components 45, the opaque-layer-break tampering event generates a tamper-event warning signal responsive to the touch. In this manner the optical anti-tamper system 12 and all the implementations of the embodiments described herein provide two levels of anti-tamper protection.

Figure 10A:
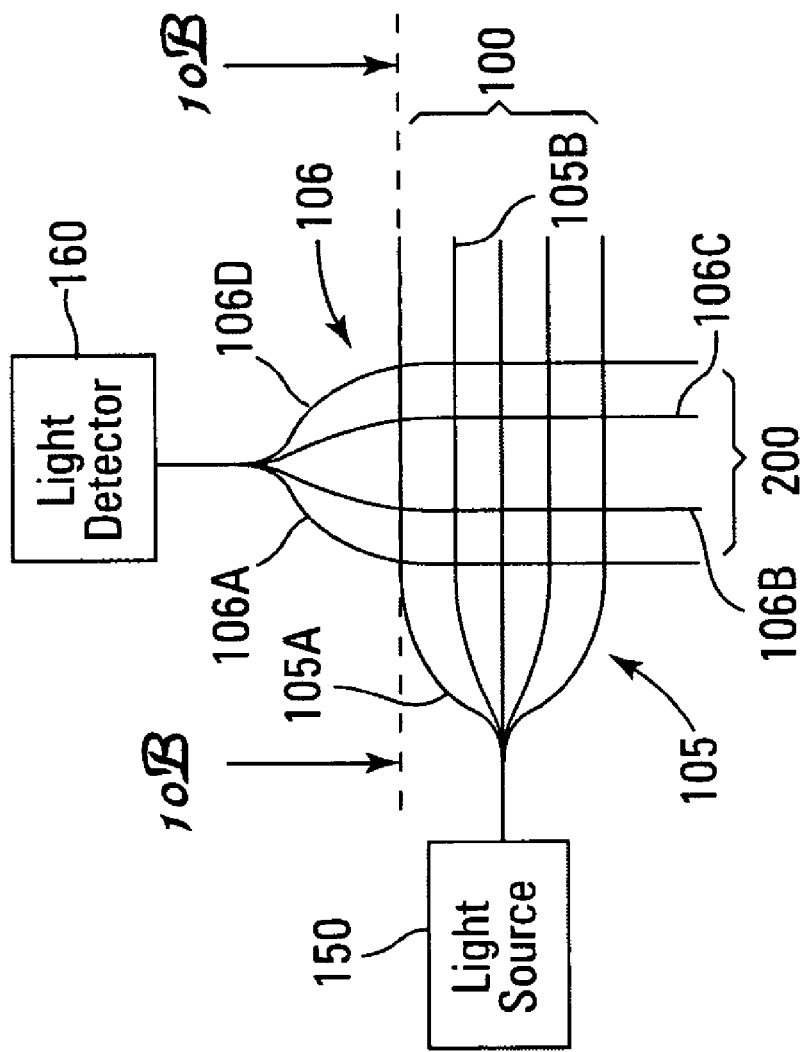
FIGS. 10A and 10B show an alternative implementation for the light emitting layer and light detecting layer of the present invention.
Figure 10B:
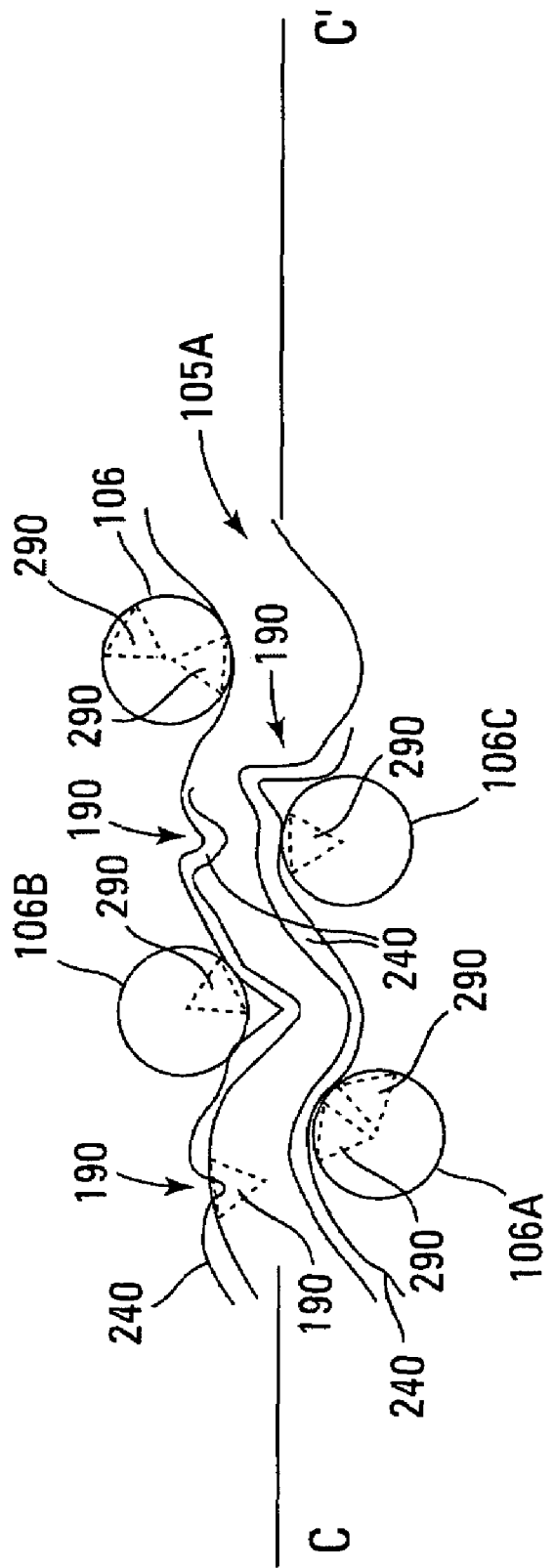

FIGS. 10A and 10B show alternative implementation for the light emitting layer 100 and light detecting layer 200. The emitter optical fiber 105 and the detector optical fiber 106 are woven rather than interleaved. FIG. 10A shows a top-view of the light emitting layer 100 and light detecting layer 200 optically coupled to the light source 150 and the light detector 160, respectively. The plane upon which the cross-section view of FIG. 10B is taken is indicated by section line 10B-10B in FIG. 10A. In FIG. 10B, the emitter optical fiber 105A (FIG. 10A) is shown in cross-section with the four detector optical fibers 106A-106D alternately below and above the emitter optical fiber 105A. As is understood about weaving patterns, a cross-sectional view of emitter optical fiber 105B (FIG. 10A) is FIG. 10B flipped about the horizontal line C-C'. In an embodiment of an optical anti-tamper system that implements a light emitting layer 100 woven with the light detecting layer 200, the transparent abrasive layer 275, as described above with reference to FIG. 3, surrounds the light emitting layer 100 and light detecting layer 200. The woven light emitting layer 100 and light detecting layer 200 are located above and/or near the components 45 to be protected from a tamper-event. During a tamper event, the woven light emitting layer 100 and light detecting layer 200 are touched, the thin film opaque layer 240 in the bevel cuts 190 is broken by abrasive particles and the light detector 160 receives light 300.

FIGS. 11-14 illustrate views (or partial views) of implementations of another embodiment of an optical anti-tamper system 12. The manner of locating an opaque layer between the light emitting layer 100 and the light detecting layer 200 to prevent light emitted from the light emitting layer 100 from being incident on the light detecting layer 200 when in an unbroken state differs in this implementation. This embodiment does not include a thin film opaque layer 240 covering the emitter optical fiber.

Figure 11:
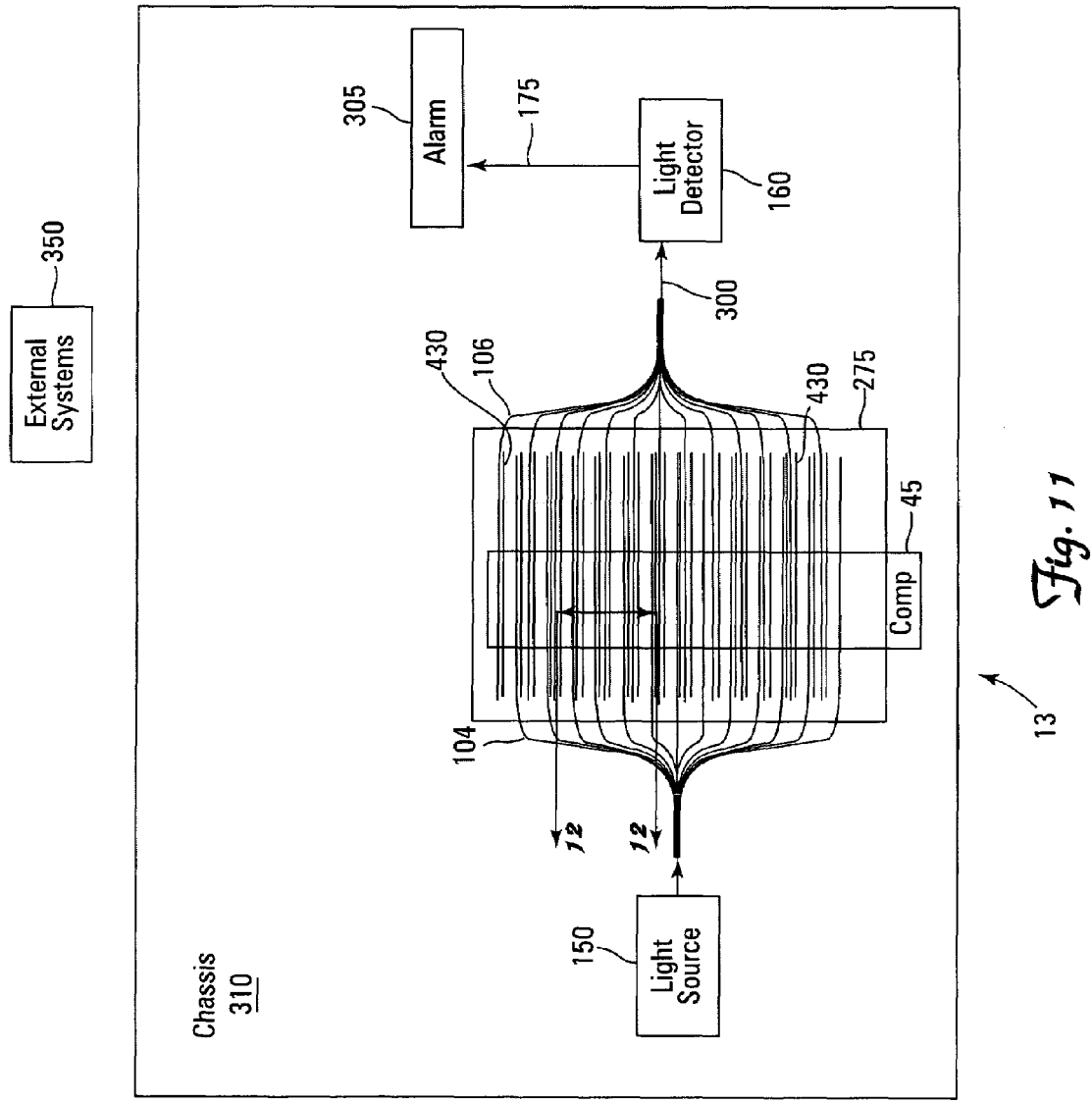
FIG. 11 is a top-view of another embodiment of the optical anti-tamper system of the present invention.

FIG. 11 is a top-view of another embodiment of the optical anti-tamper system 13. Optical anti-tamper system 13 is similar to optical anti-tamper system 12 except the bevel cuts 190 are not coated with the thin film opaque layer 240. The emitter optical fiber 104 is uncoated as illustrated in FIG. 2. Between each adjacent emitter optical fiber 104 and the detector optical fiber 106 there is an opaque layer 430. The transparent abrasive layer 275 contacts the opaque layer 430. In one implementation of this embodiment, the transparent abrasive layer 275 is replaced with a transparent layer that does not include abrasive particles.

Figure 12:
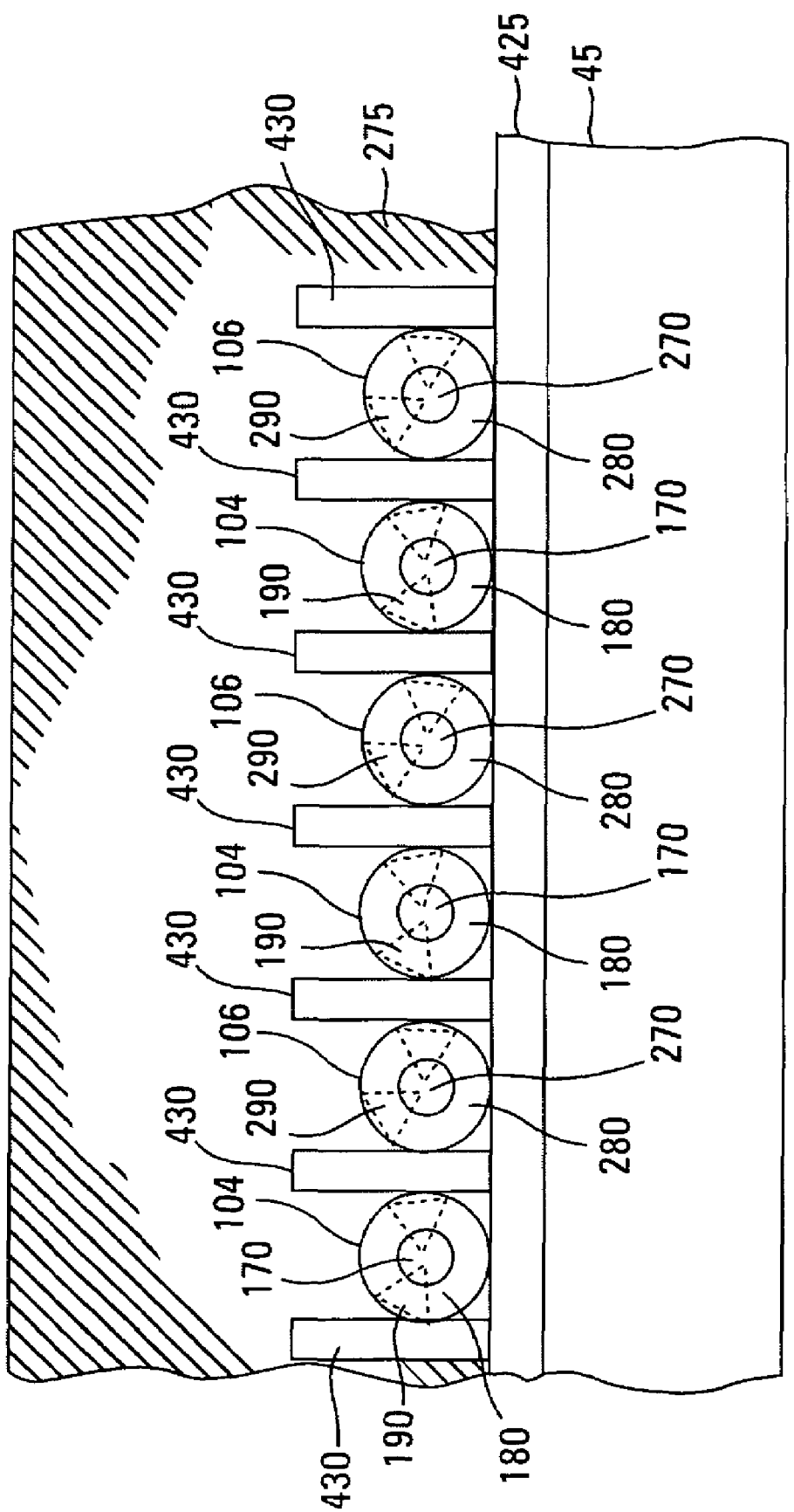
FIG. 12 is an expanded cross-sectional side view of the opaque layer interleaved between adjacent the emitter optical fibers and the detector optical fiber of one embodiment of the present invention.
Figure 13:
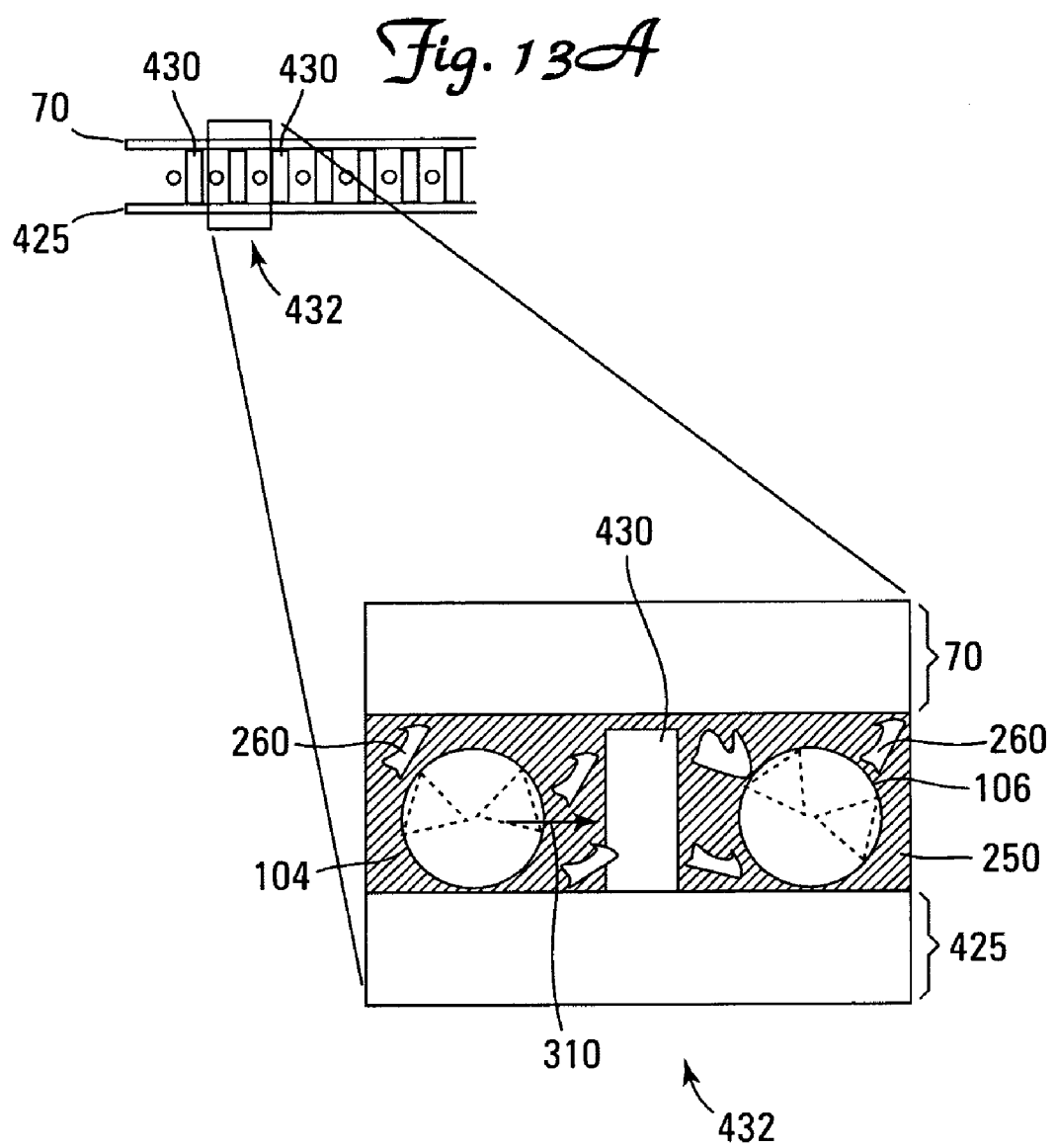
FIGS. 13A and 13B are cross-sectional side views of a portion of the optical anti-tamper system of FIG. 12 in an unbroken state.
Figure 14:
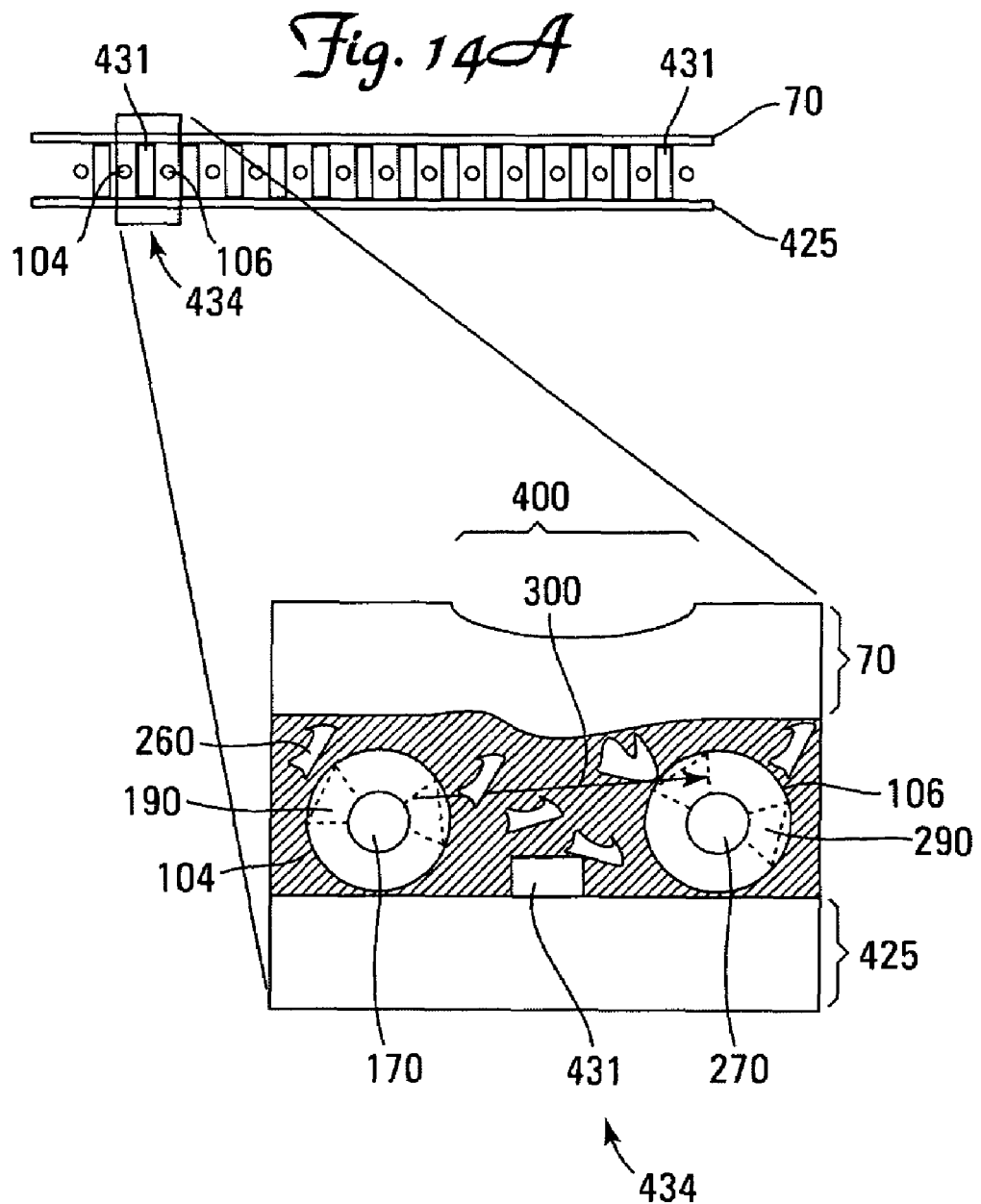
FIGS. 14A and 14B are cross-sectional side views of the portion of the optical anti-tamper system of FIG. 12 in a broken state.

FIG. 12 is an expanded cross-sectional side view of the opaque layer 430 interleaved between adjacent the emitter optical fibers 104 and the detector optical fiber 106. The plane upon which the cross-section view of FIG. 12 is taken is indicated by section line 12-12 in FIG. 11. The opaque layers 430 are comb-like structures protruding from a base 425. The opaque layers 430 extend at least the length of the main body region 107 of the emitter optical fiber 104, which is parallel to and about the length of the main body region 108 of detector optical fiber 106. The opaque layers 430 extend in height from the base 425 to about the diameter of the emitter optical fiber 104 and detector optical fiber 106.

There is an opaque layer 430 between each adjacent emitter optical fiber 104 and detector optical fiber 106. The transparent abrasive layer 275 fills in the space between the emitter optical fiber 104 and the opaque layer 430 and between the detector optical fiber 106 and the opaque layer 430. The transparent abrasive layer 275 includes the gel 250 and the transparent abrasive particles 260 as described above with reference to FIG. 3. The base 425 overlies the one or more components 45. In one implementation of this embodiment the base 425 is reflective. In another implementation of this embodiment, the base 425 and the opaque layer 430 are the same material. In one case, the base 425 and the opaque layer 430 are molded from an opaque material. In another case, the base 425 and the opaque layer 430 are formed using processing techniques to form the comb like structure.

FIGS. 13A and 13B are cross-sectional side views of a portion of the optical anti-tamper system 13 of FIG. 11 in an unbroken state. FIG. 13A is a cross-sectional side view of a portion of the optical anti-tamper system of FIG. 11 in an unbroken state. Region 432 of FIG. 13A is shown in an enlarged view in FIG. 13B. As shown in FIG. 13B, the transparent abrasive particles 260 are in contact or near contact with the opaque layer 430. A top reflective surface 70 overlies adjacent emitter optical fiber 104 and detector optical fiber 106. The top reflective surface 70 and the base 425 form an envelope to hold the gel 250 and the transparent abrasive particles 260 in the space between the emitter optical fiber 104 and the opaque layer 430 and between the detector optical fiber 106 and the opaque layer 430. Light 310 is emitted from the bevel cut 190 and is absorbed by the opaque layer 430. In FIGS. 13A and 13B, the opaque layer 430 is unbroken since the transparent abrasive particles 260 are not forced into the opaque layer 430.

FIGS. 14A and 14B are cross-sectional side views of the portion of the optical anti-tamper system 13 of FIGS. 11 and 12 in a broken state. FIG. 14A is a side view of the portion of the optical anti-tamper system of FIGS. 13A and 13B in a broken state after a tampering event has occurred. Region 434 of FIG. 14A is shown in an enlarged view in FIG. 14B. As shown in FIG. 14B, the opaque layer 430 is broken. During a tampering event the top reflective surface 70 or base 425 is touched so that transparent abrasive particles 260 are forced into contact with the opaque layer 430 and the opaque layer 430 ruptures. The light 300 is emitted from the bevel cut 190 in emitter optical fiber 104 and coupled into the core 280 of the detector optical fiber 106 via the bevel cut 290. The break in opaque layer 430 is along a line of sight between the adjacent emitter optical fiber 104 and detector optical fiber 106. In this manner the light 300 is coupled into the detector optical fiber 106 and is transmitted to the detector 160. Light in the detector optical fiber 106 is coupled into the light detector 160. The light detector 160 detects an increase in the light level from the calibrated light level in response to the light 300 being transmitted to the core 270 of the detector optical fiber 106.

Figure 15:
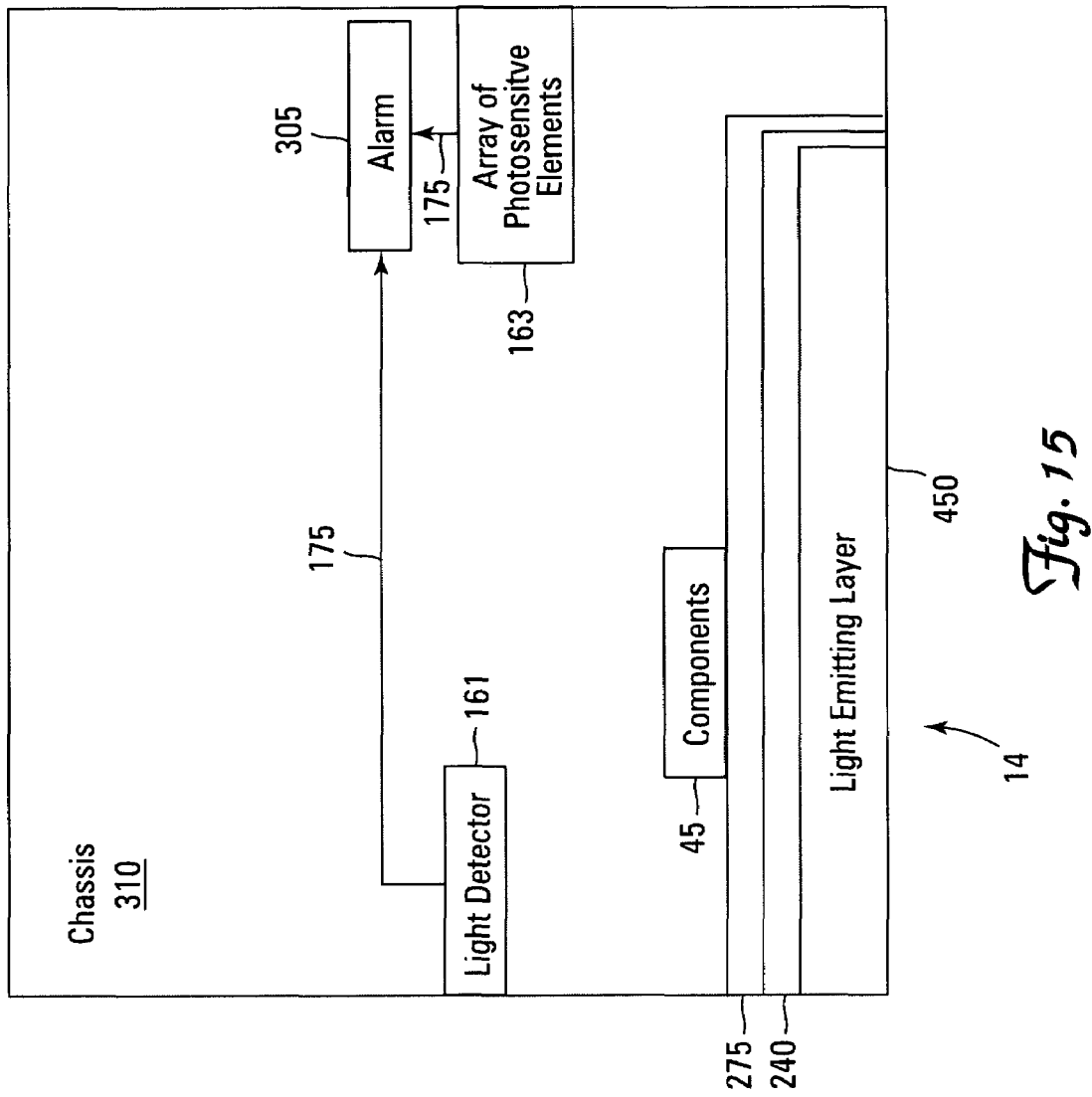
FIG. 15 is a side view of an embodiment of the optical anti-tamper system of the present invention.
Figure 16:
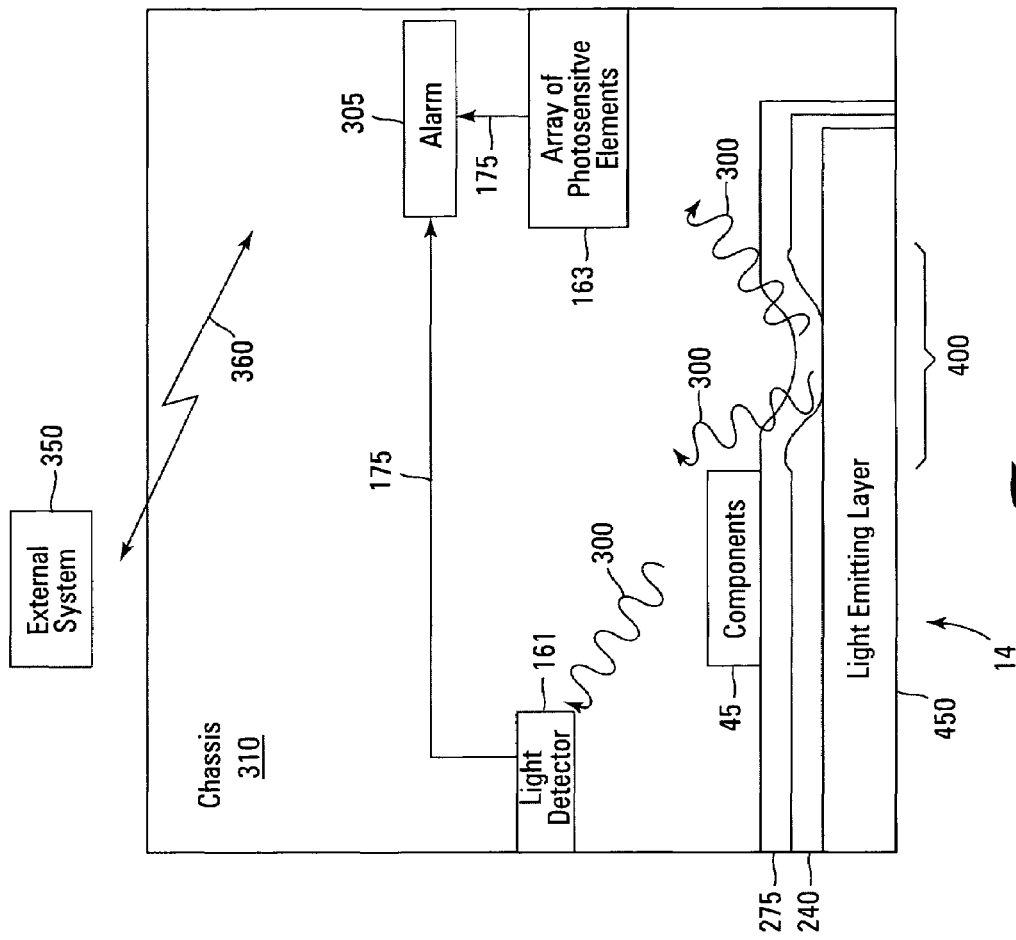
FIG. 16 is a side-view of an embodiment of the optical anti-tamper system of FIG. 15 in a broken state.
Figure 17:
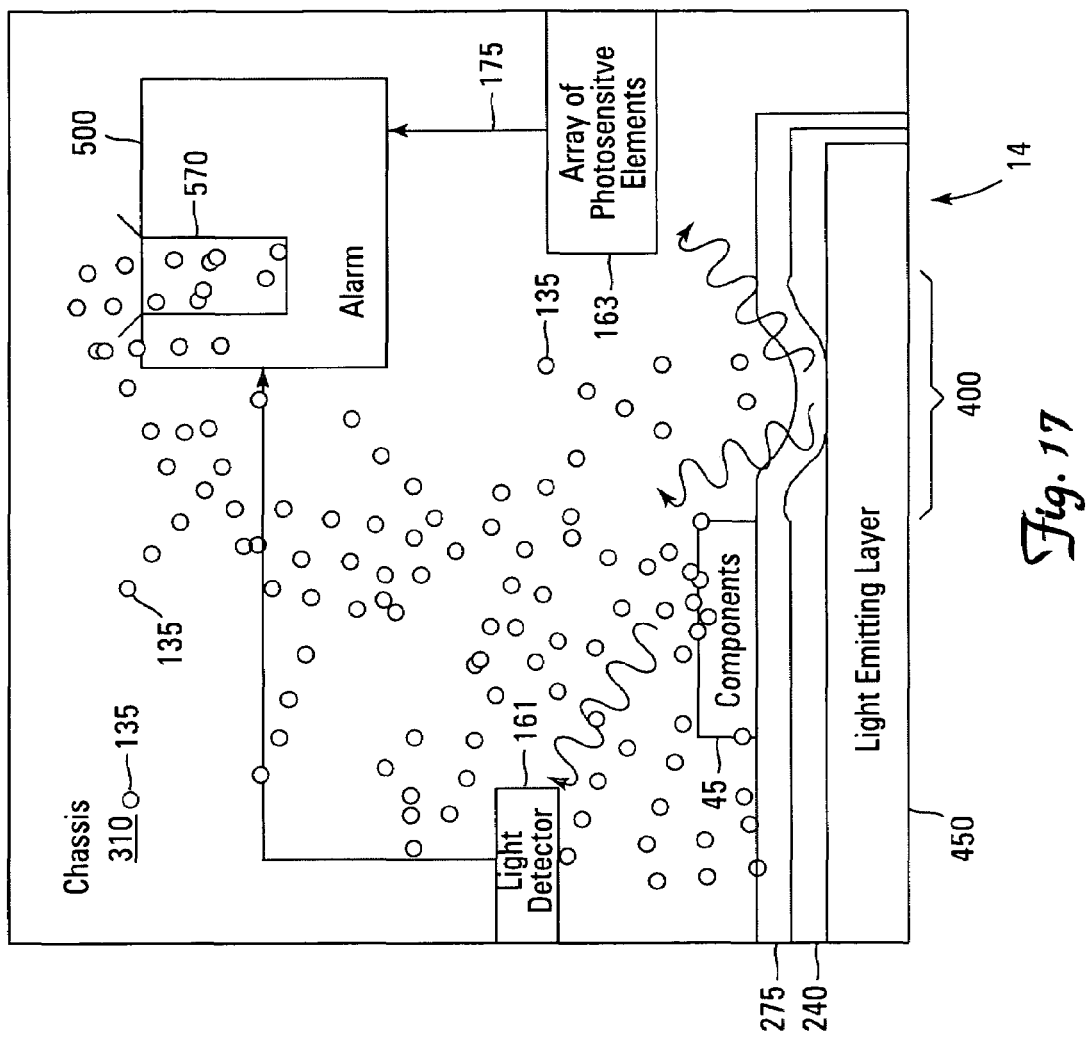
FIG. 17 is a side-view of an embodiment of the optical anti-tamper system of FIG. 15 in a broken state.

FIGS. 15-17 illustrate views (or partial views) of implementations an optical anti-tamper system 14. In this embodiment, light emitting layer 450 is an array of light sources 450 and the light detecting layer is an array of photosensitive elements 163. In optical anti-tamper system 14 an opaque layer is located between the array of light sources and the array of photosensitive elements. The opaque layer prevents light emitted from the array of light sources from being incident on the array of photosensitive elements when in an unbroken state. A transparent abrasive layer is located between the array of light sources and the array of photosensitive elements. The transparent abrasive layer breaks the opaque layer when a protected component positioned adjacent to the transparent abrasive layer is touched during a tampering event putting the opaque layer in a broken state. The array of light sources and the array of photosensitive elements are positioned so that the light emitted from the array of light sources is incident on the array of photosensitive elements when the opaque layer is in the broken state.

In one implementation of this embodiment, the array of light sources 450 is selected from the group comprising an array of light emitting diodes, an array of lasers, an array of vertical cavity light emitting diodes and combinations thereof. In another one implementation of this embodiment, the array of photosensitive elements 163 is selected from an array of photosensitive pixels, a charge-coupled device, an array of photo-detectors and combinations thereof. In yet another one implementation of this embodiment, the array of photosensitive elements 163 is replaced by a single light detector such as light detector 160. In yet another one implementation of this embodiment, the array of photosensitive elements is replaced by a single light detector 160 and an array of photosensitive elements 163 as shown in FIG. 15.

FIG. 15 is a side view of an embodiment of the optical anti-tamper system 14. As shown in FIG. 15, the opaque layer 240, that is designed to absorb the light emitted from the light emitting layer 450, completely overlies the light emitting layer 450. The transparent abrasive layer 275 overlies, at least in part, the opaque layer 240. The protected components 45 are located over the transparent abrasive layer 275. In this implementation of the embodiment of optical anti-tamper system 14, the photosensitive elements include a light detector 161 and an array of photosensitive elements 163. In one implementation of this embodiment, the transparent abrasive layer is replaced with a transparent layer that does not include abrasive particles 260. The terms "light detecting layer 163" and "array of photosensitive elements 163" are used interchangeably herein.

FIG. 16 is a side-view of an embodiment of the optical anti-tamper system 14 of FIG. 15 in a broken state. In FIG. 16, the optical anti-tamper system 14 is in the process of transmitting a tamper-event warning signal 360 to the external system as described above with reference to FIG. 7. As described above with reference to block 902 in method 900 of FIG. 9, the photosensitive elements 162 of the optical anti-tamper system 14 are calibrated for the ambient light level in the closed chassis 310. As described above with reference to block 904 of method 900 in FIG. 9, during a tampering event the transparent abrasive layer 275 is contacted and the opaque layer 240 is broken by the transparent abrasive particles 260 in the transparent abrasive layer 275.

The light detector 161 and the array of photosensitive elements 163 are along a line of sight with the light emitting layer 450 so that the break in the opaque layer 240 in the touched area 400 allows light from the light emitting layer 450 to be incident on the detector 161 and the array of photosensitive elements 163. The detector 161 and the array of photosensitive elements 163 are in communication with alarm 305 as indicated by arrows 175. The light level of the light incident on detector 161 and the array of photosensitive elements 163 increases when the opaque layer 240 is broken. The alarm 305 is operable to transmit a tamper-event signal to an external system 350 if an increased light level is detected by detector 161 and the array of photosensitive elements 163. The external system 350 is external to the chassis 310. The component 45, shown in FIGS. 15-17, as one component, is representative of one or more components. The portion of the component 45 covered by the light emitting layer 100 and the light detecting layer 200 includes the proprietary technology.

FIG. 17 is a side-view of an embodiment of the optical anti-tamper system of FIG. 15 in a broken state. As shown in FIG. 17, the alarm 500 includes a container 570. When the alarm 500 generates a tamper-event warning signal, the container 570 is automatically triggered by the alarm 500 to open. When the container 570 opens, a material 135 in the container is emitted and disperses within the open chassis 40. The material 135 is the same material described above with reference to FIGS. 8 and 9 and is operable to destroy or damage at least a portion of the components 45 that are being protected to prevent proprietary information from being retrieved from the components 45 in the open chassis 40.

In this manner, optical anti-tamper system 14 and all the implementations of the embodiments described herein are operable to break an opaque layer responsive to a touching of one or more components within a chassis, to detect an increased light level within the chassis responsive to the break and to generate tamper-event warning signal responsive to the detecting.

If the event that the chassis 310 is opened in an environment that includes externally generated light, the photosensitive elements 162 of the optical anti-tamper system 14 experience an increase in detected light level and the alarm 305 or 500 generate a tamper-event warning signal.

Figure 18:
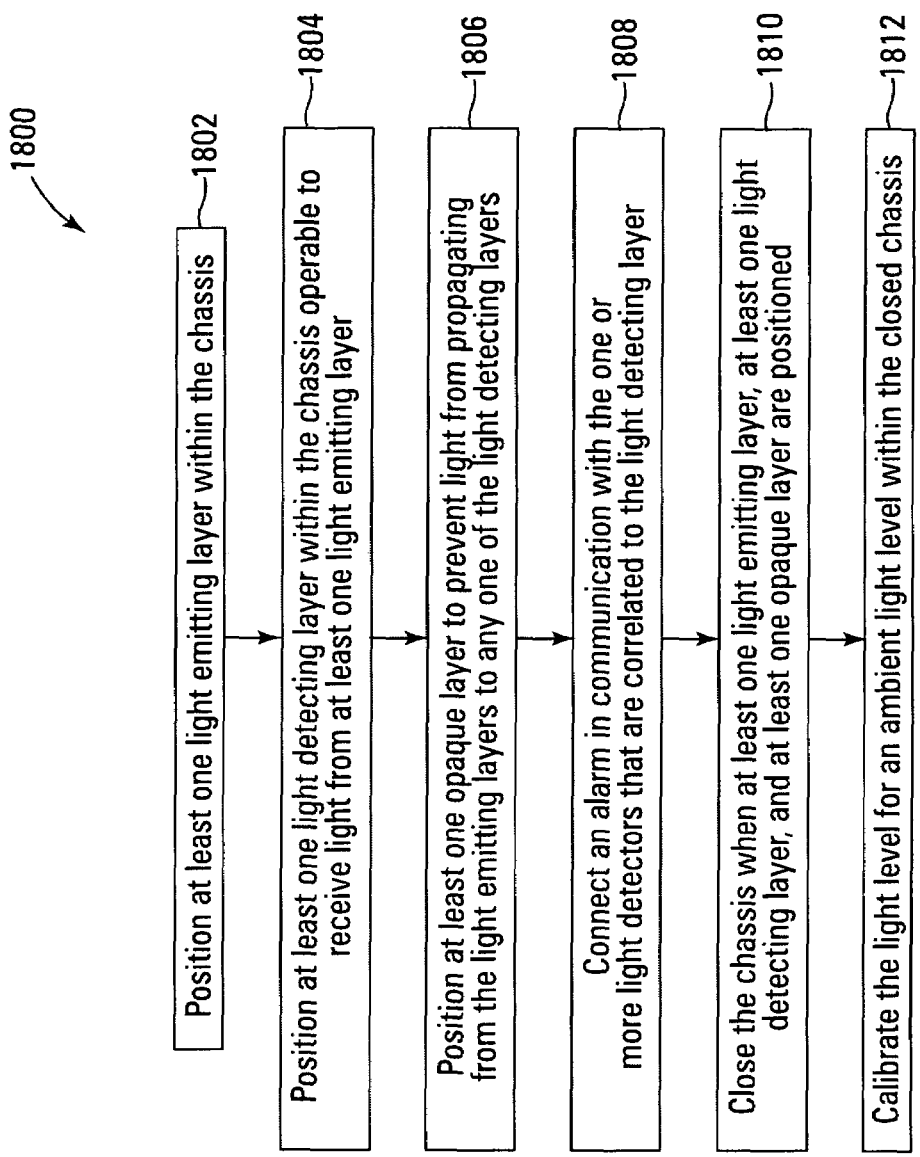
FIG. 18 is an embodiment of a method to manufacture an optical anti-tamper system of the present invention.

FIG. 18 is an embodiment of a method 1800 to manufacture an optical anti-tamper system. The method of manufacture is described for optical anti-tamper system 14 as shown in FIG. 15.

At block 1802, one or more light emitting layer 450 is positioned within the chassis 310 along with the components 45 to be protected and the alarm 305. At block 1804, at least one light detecting layer 163, is positioned within the chassis 310 in a position that makes the light detecting layer operable to receive light from at least one light emitting layer 450. At block 1806, at least one opaque layer 240 is positioned to prevent light from propagating from the light emitting layers 450 to any one of the light detecting layers 163. The opaque layer 240 is overlaid by the transparent abrasive layer 275.

At block 1808, the alarm 305 is connected to communicate with the one or more light detectors correlated to the light detecting layer. The light detecting layers 163 are electrically connected to the alarm 305 as indicated by arrow 175 (FIG. 15).

At block 1810, the chassis 310 is closed when the at least one light emitting layer 450, at least one light detecting layer 163, and the at least one opaque layer 240 are positioned within the chassis 310. At block 1812, the optical anti-tamper system 11 is calibrated as described above with reference to block 902 in method 900 of FIG. 9.

Figure 19A:
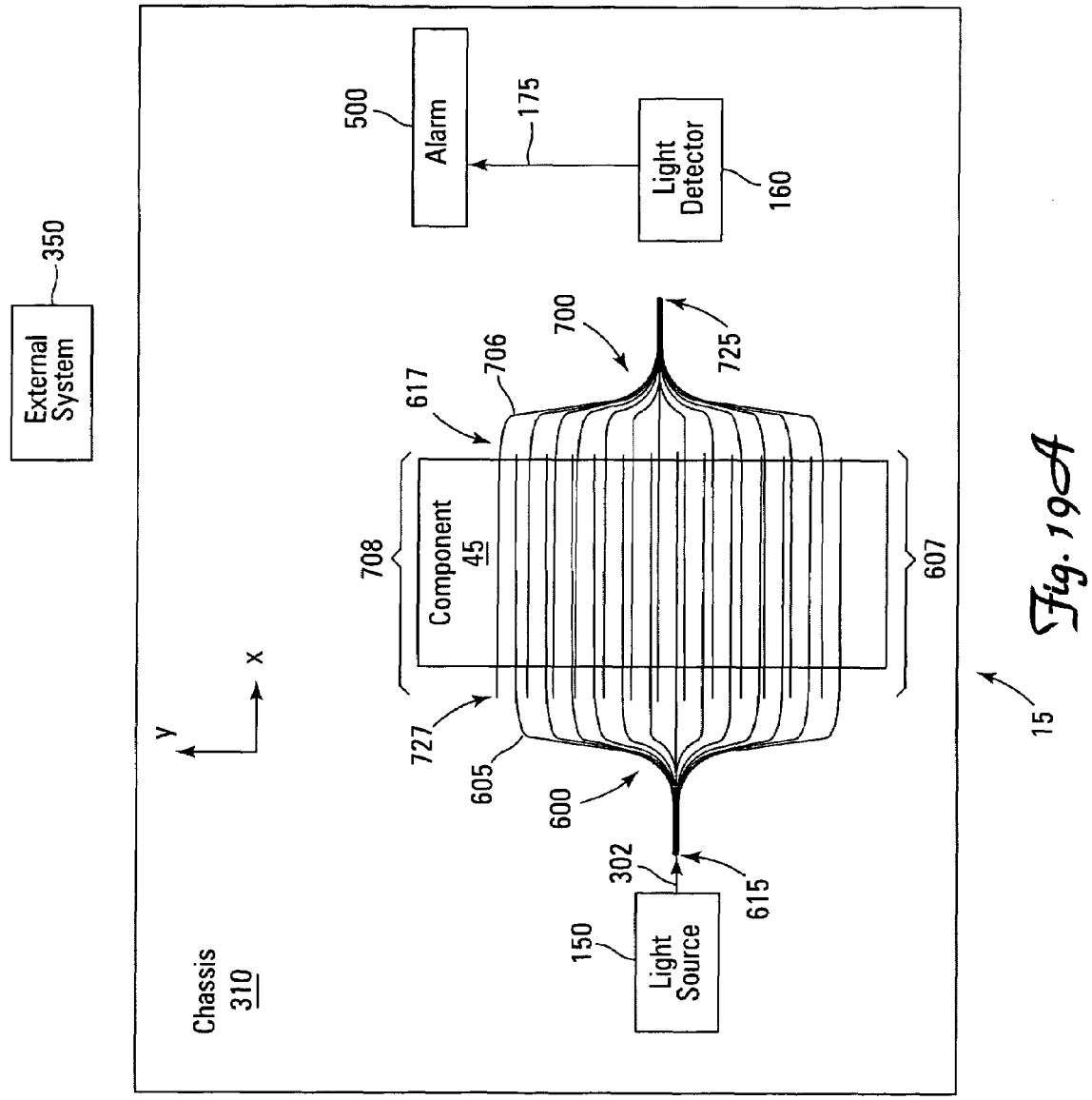
FIG. 19A is a top-view of an embodiment of the optical anti-tamper system.

FIG. 19A is a top-view of an embodiment of the optical anti-tamper system 15. The optical anti-tamper system 15 includes a light emitting layer 600, a light detecting layer 700, light source 150, light detector 160, and an alarm 500 enclosed within a chassis 310 and in contact with a proprietary part of component 45 that is to be protected from a tampering event.

Figure 19B:
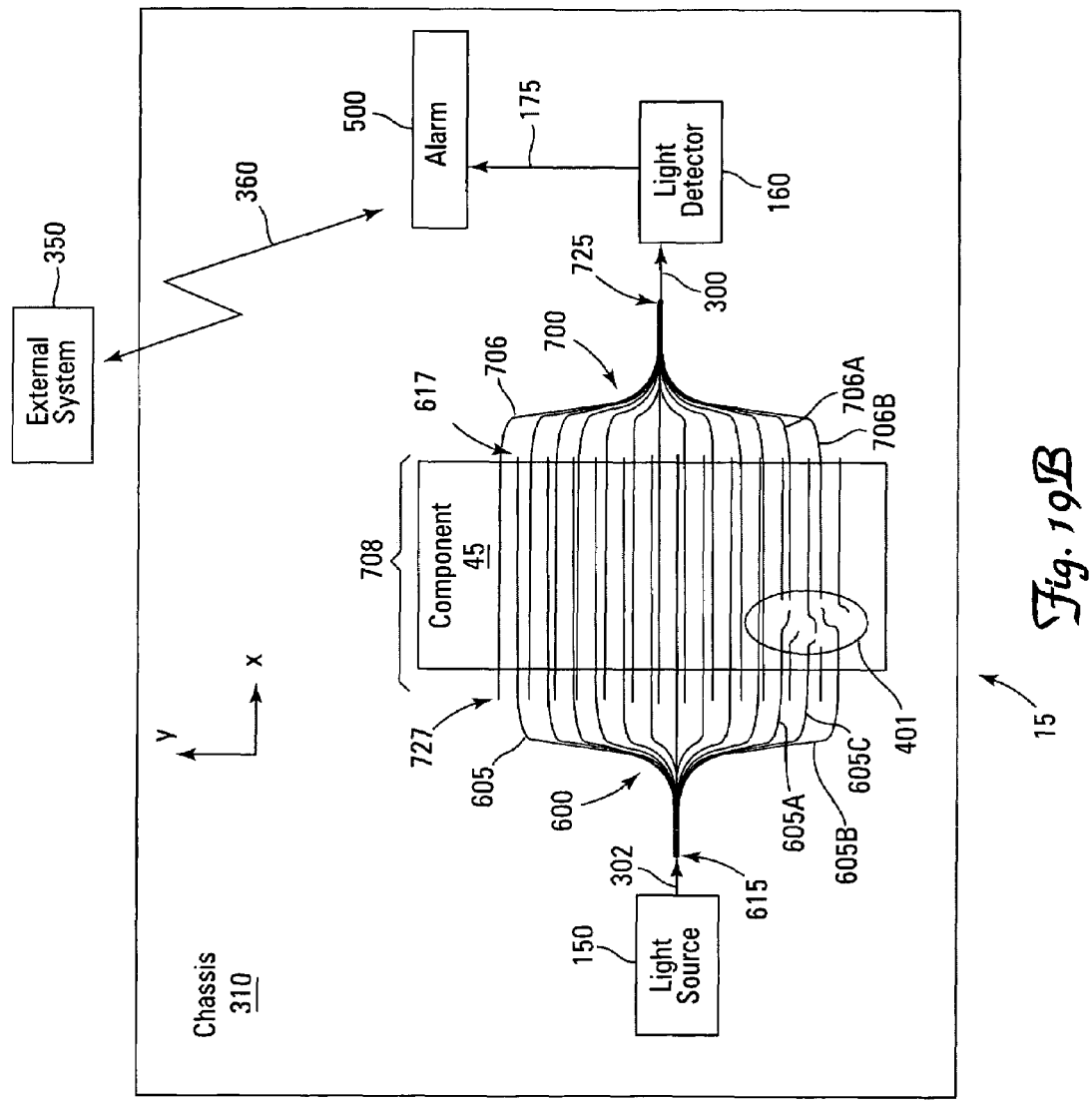
FIG. 19B is the optical anti-tamper system of FIG. 19A in a broken state.

The light emitting layer 600 is optically coupled to the light source 150. The light emitting layer 600 includes a plurality of emitter optical fibers designated generally as 605. Emitter optical fibers 605 are similar to emitter optical fibers 104 (FIG. 2) except that there are no bevel cuts in the emitter optical fibers 605. As shown in FIGS. 19A and 19B, the input ends generally designated as 615 of the emitter optical fibers 605 are bundled for optical coupling to one or more light sources represented as a single light source 150. In this manner, one or more light sources 150 are optically coupled to the light emitting layer 600. The output ends generally designated as 617 of the emitter optical fibers 605 are spatially separated by a distance that permits a detector optical fiber 706 to lie between adjacent emitter optical fibers 605.

A main body region generally designated as 607 of each of the emitter optical fibers 605 lies in a straight line. The main body regions 607 of neighboring emitter optical fibers 605 are separated by approximately equal distances. The main body region 607 ends at the output ends 617 of the emitter optical fiber 605. In one implementation of the embodiment of emitter optical fiber 605, the main body region 607 is about half the length of the emitter optical fiber 605. In another implementation of the embodiment of emitter optical fibers 105, the main body regions 607 range from between half the length of the respective emitter optical fiber 605 and three-quarters of the length of the respective emitter optical fiber 605. The main body regions 607 of emitter optical fibers 605 lie approximately in a plane defined by vectors X and Y.

The light detecting layer 700 is optically coupled to a light detector 160. The light detecting layer 700 includes a plurality of detector optical fibers generally designated as 706. As shown in FIGS. 19A and 19B, the output ends generally designated as 725 of the of detector optical fibers 706 are bundled for optical coupling to one or more light detectors represented as a single light detector 160. In this manner, one or more light detectors 160 are optically coupled to the light detecting layer 700 so that the light detector 160 is optically coupled to receive light that propagates through any of the detector optical fibers 706. The input ends generally designated as 727 of the of detector optical fibers 706 are spatially separated by a distance that permits a emitter optical fiber 605 to lie between adjacent detector optical fibers 706.

A main body region 708 of each of the detector optical fibers 706 lies in a straight line. The main body regions 708 of neighboring detector optical fibers 706 are separated by approximately equal distances. The main body region 708 ends at the input ends 727 of the detector optical fiber 706. In one implementation of the embodiment of detector optical fiber 706, the main body region 708 is about half the length of the detector optical fiber 706. In another implementation of the embodiment of detector optical fiber 706, the main body region 708 from between half the length of the respective detector optical fiber 706 and three-quarters of the length of the respective detector optical fiber 706.

The main body regions 708 of detector optical fibers 706 lie approximately in the plane defined by vectors X and Y. Additional physical details of embodiments of the detector optical fibers 706 are described below with reference to FIG. 3. In one implementation of embodiments of light emitting layer 600 and light detecting layer 700, the distance between adjacent emitter optical fibers 605 is about 1.5 to 3 times the diameter of the detector optical fibers 706 and the distance between adjacent detector optical fibers 706 is about 1.5 to 3 times the diameter of the emitter optical fibers 605. In another implementation of embodiments of light emitting layer 600 and light detecting layer 700, the distance between all adjacent emitter optical fibers 605 and detector optical fibers 706 is about equal.

The emitter optical fibers 605 of light emitting layer 600 are interleaved with the detector optical fibers 706 of the light detecting layer 700. The emitter optical fibers 605 and detector optical fibers 706 can be glass optical fiber, plastic optical fibers, multimode optical fiber, single mode optical fiber, and any flexible light pipe.

The alarm 500 is operable as described above with reference to FIG. 7, to damage at least a portion of components 45 within the chassis 310 responsive to a tamper-event warning signal so that the damaged portion of the components 45 are inoperable and/or irretrievable.

Figure 19C:
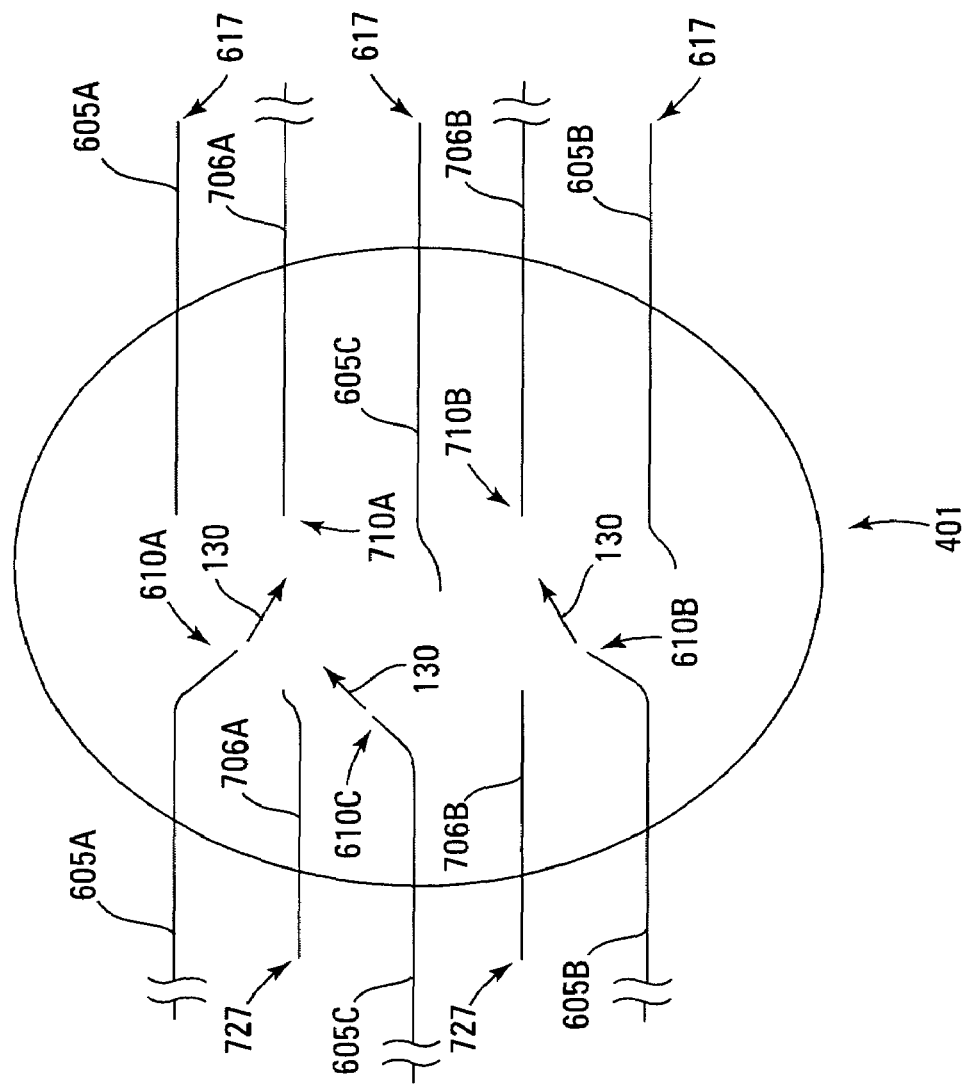
FIG. 19C is an enlarged view of the cut area.

The optical anti-tamper system 15 operates to detect a tampering event in which one or more of the emitter optical fibers 605 and one or more of the detector optical fibers 706 are cut or broken. FIG. 19B is the optical anti-tamper system of FIG. 19A in a broken state after at least a portion of the light emitting layer 600 and the light detecting layer 700 are cut as illustrated in cut area 401. FIG. 19C is an enlarged view of the cut area 401. When an object cuts the interleaved light emitting layer 600 and light detecting layer 700 as it overlies at least a portion of the component 45, a cutting-tampering event occurs. Light 302 from light source 150 (FIG. 19B) that propagates along emitter optical fiber 605A, 605B and 605C is emitted as light 130 from the cut ends 610A, 610B and 610C, respectively (FIG. 19C). A portion of the light 130 is optically coupled into detector optical fiber 706A and 706B at the cut ends 710A and 710B, respectively. The light coupled into the cuts ends 710A and 710B of detector optical fibers 706A and 706B, respectively, propagates from the cut ends 710A and 710B to output ends 725 and is coupled as light 300 into the light detector 160.

The detector 160 is in communication with alarm 500 as indicated by arrow 175 (FIG. 19B). The alarm 500 is operable to transmit a tamper-event signal 360 to the external system 350 if an increased light level is detected by detector 160. The external system 350 is external to the chassis 310. The component 45 shown as one component in FIGS. 19A-19B, is representative of one or more components. The portion of the component 45 covered by the light emitting layer 600 and the light detecting layer 700 includes the proprietary technology. In this manner, the optical anti-tamper system 15 detects an increased light level within the chassis responsive to cutting a light emitting layer 600 located within a chassis and an adjacent a light detecting layer 700 located within the chassis 310 generates tamper-event warning signal responsive to the detecting and is enabled to damage at least a portion of components within the chassis 310 responsive to the generated tamper-event warning signal.

Although specific embodiments have been illustrated and described herein, it will be appreciated by those of skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An optical anti-tamper system, the system comprising:
  a light emitting layer located within a chassis comprising one or more emitter optical fibers, each emitter optical fiber including a plurality of output ports on a side surface of the emitter optical fiber, the output ports operable to transmit light propagating through the emitter optical fiber outside of the emitter optical fiber;
  a light detecting layer located within the chassis comprising one or more detector optical fibers, each detector optical fiber including a plurality of input ports on a side surface of the detector optical fiber, the input ports operable to receive light for propagation within the detector optical fiber; and
  one or more detectors optically coupled to the light detecting layer, the one or more detectors in communication with an alarm, wherein the alarm is operable to transmit a tamper-event warning signal if an increased light level is detected by at least one detector.

2. The system of claim 1, the system further comprising:
one or more light sources optically coupled to the light emitting layer.

3. The system of claim 1, the system further comprising:
a transparent layer located at an interface between the light emitting layer and the light detecting layer.

4. The system of claim 3, wherein the transparent layer is a transparent abrasive layer comprising a gel and abrasive particles dispersed within the gel.

5. The system of claim 1, wherein one or more light sources are optically coupled to an input end of the one or more emitter optical fibers, wherein the output ports on a side surface of the emitter optical fiber are bevel cuts to at least a core of the emitter optical fibers.

6. The system of claim 5, wherein a thin film opaque layer covers the bevel cuts to at least a core of the emitter optical fibers.

7. The system of claim 6, wherein the input ports on a side surface of the detector optical fiber are bevel cuts to at least a core of the detector optical fibers.

8. The system of claim 1, the system further comprising:
a transparent layer; and
an opaque layer in contact with the transparent abrasive layer, wherein the input ports on a side surface of the detector optical fibers are bevel cuts to at least a core of the detector optical fibers, wherein the output ports on a side surface of the emitter optical fibers are bevel cuts to at least a core of the emitter optical fibers, and wherein the opaque layer is interleaved between adjacent emitter optical fibers and detector optical fibers.

9. The system of claim 8, wherein the transparent layer is a transparent abrasive layer comprising a gel and abrasive particles dispersed within the gel.

10. The system of claim 1, wherein the detector optical fibers are one of interleaved or inter-woven with the emitter optical fibers.

11. The system of claim 1, wherein the emitter optical fibers, the detector optical fibers are surrounded, at least in part, by reflective surfaces.

12. A method of manufacture, the method comprising:
positioning at least one light emitting layer within a chassis, the light emitting layer comprising one or more emitter optical fibers, each emitter optical fiber including a plurality of output ports on a side surface of the emitter optical fiber, the output ports operable to transmit light propagating through the emitter optical fiber outside of the emitter optical fiber;
positioning at least one light detecting layer within the chassis operable to receive light from at least one light emitting layer, the light detecting layer comprising one or more detector optical fibers, each detector optical fiber including a plurality of input ports on a side surface of the detector optical fiber, the input ports operable to receive light for propagation within the detector optical fiber;
positioning at least one opaque layer to prevent light from propagating from the light emitting layers to any one of the light detecting layers; and
connecting an alarm in communication with one or more detectors correlated to the light detecting layer.

13. The method of claim 12, further comprising:
closing the chassis when the at least one light emitting layer, at least one light detecting layer, and the at least one opaque layer are positioned; and
calibrating the one or more detectors for an ambient light level within a closed chassis.

14. A method to detect a tampering event, the method comprising:
breaking an opaque layer, wherein the break is located between a light emitting layer and a light detecting layer within a chassis, the light emitting layer comprising one or more emitter optical fibers, each emitter optical fiber including a plurality of output ports on a side surface of the emitter optical fiber, the output ports operable to transmit light propagating through the emitter optical fiber outside of the emitter optical fiber, and the light detecting layer comprising one or more detector optical fibers, each detector optical fiber including a plurality of input ports on a side surface of the detector optical fiber, the input ports operable to receive light for propagation within the detector optical fiber;
transmitting light through a portion of the light detecting layer responsive to breaking the opaque layer;
detecting an increase in a light level at one or more detectors responsive to the transmitting light; and
generating a tamper-event warning signal responsive to the detecting.

15. The method of claim 14, further comprising:
damaging at least a portion of components within the chassis responsive to generating the tamper-event warning signal, wherein the damaged portion of the components is made at least one of inoperable and irretrievable.

16. The method of claim 14, further comprising:
transmitting the tamper-event warning signal responsive to generating the tamper-event warning signal.

17. The method of claim 14, further comprising:
transmitting the tamper-event warning signal responsive to generating the tamper-event warning signal.

18. The optical anti-tamper system of claim 1, further comprising: the one or more detectors detecting an increased light level within the chassis responsive to cutting the light emitting layer and the light detecting layer both located within the chassis near a protected component; and
means for generating tamper-event warning signal responsive to the detecting.

19. The optical anti-tamper system of claim 18, further comprising:
means for damaging at least a portion of the component within the chassis responsive to generating the tamper-event warning signal, wherein the damaged portion of the component is made at least one of inoperable and irretrievable.

* * * * *